Jan. 31, 1967 L. J. PHARES ET AL 3,300,988
APPARATUS FOR FORMING PILES
Original Filed Dec. 23, 1960 11 Sheets-Sheet 2
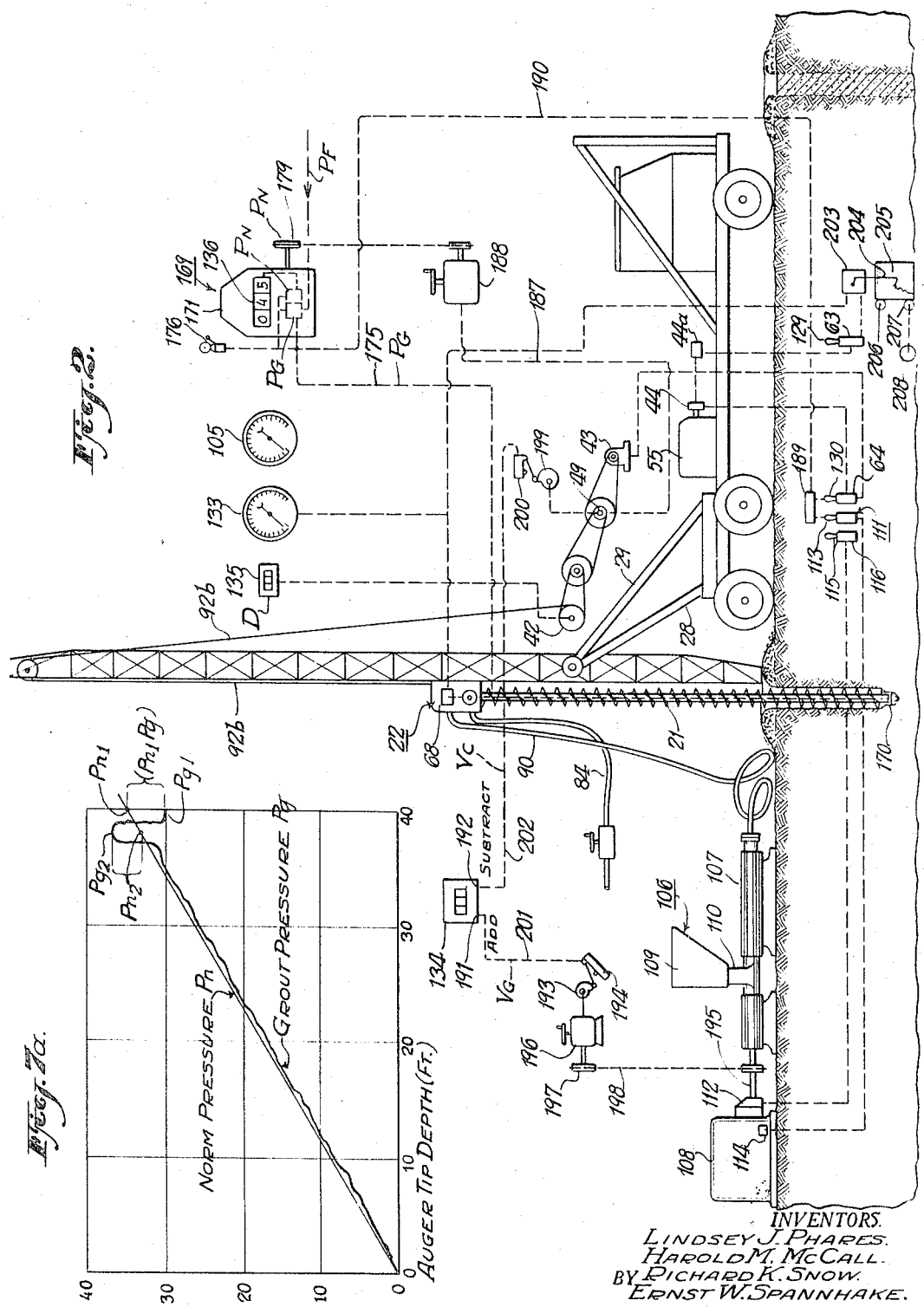
INVENTORS.
LINDSEY J. PHARES.
HAROLD M. MCCALL.
BY RICHARD K. SNOW.
ERNST W. SPANNHAKE.
Ward, Haselton, McElhannon, Orme Brooks & Fitzpatrick
ATTORNEYS.

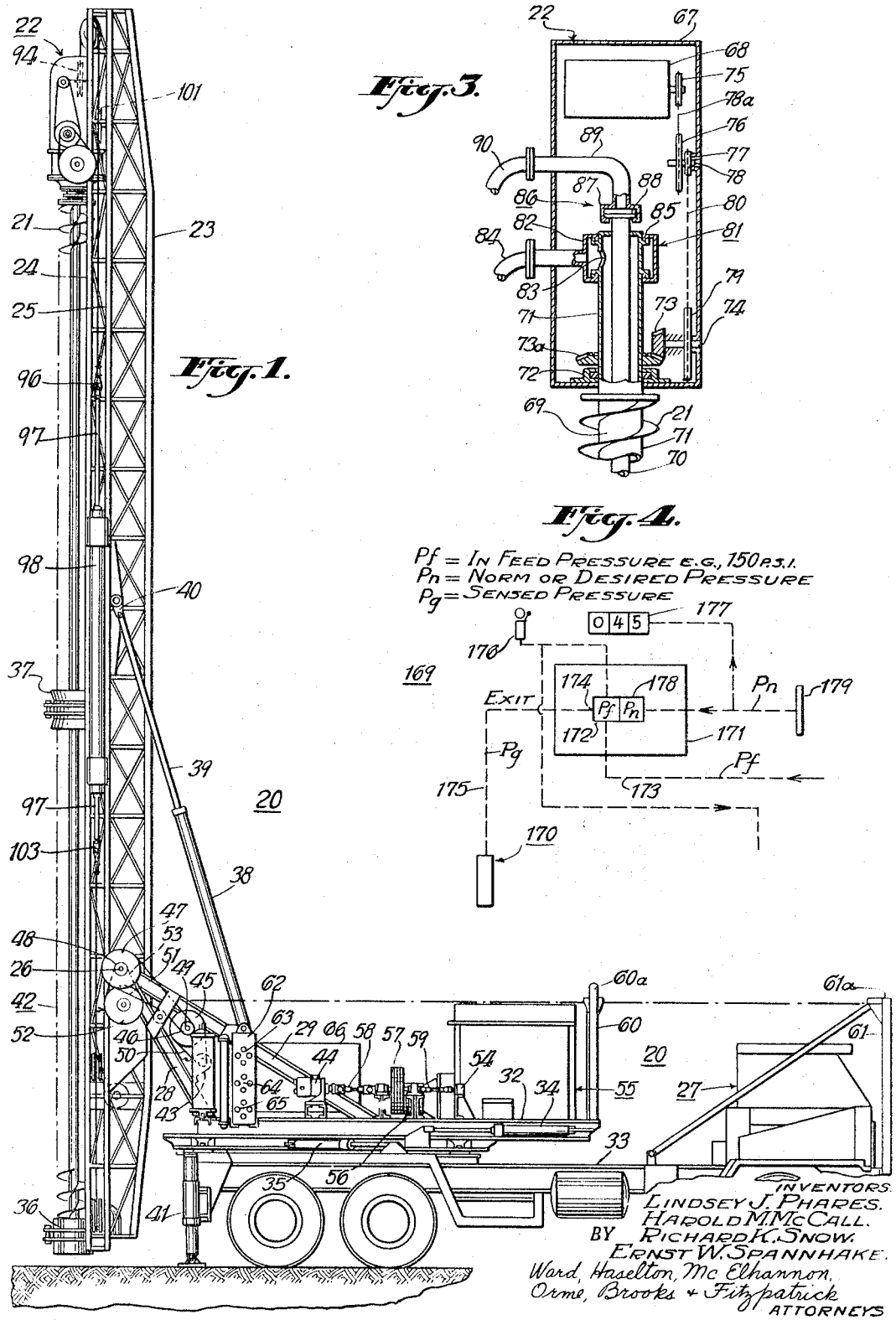

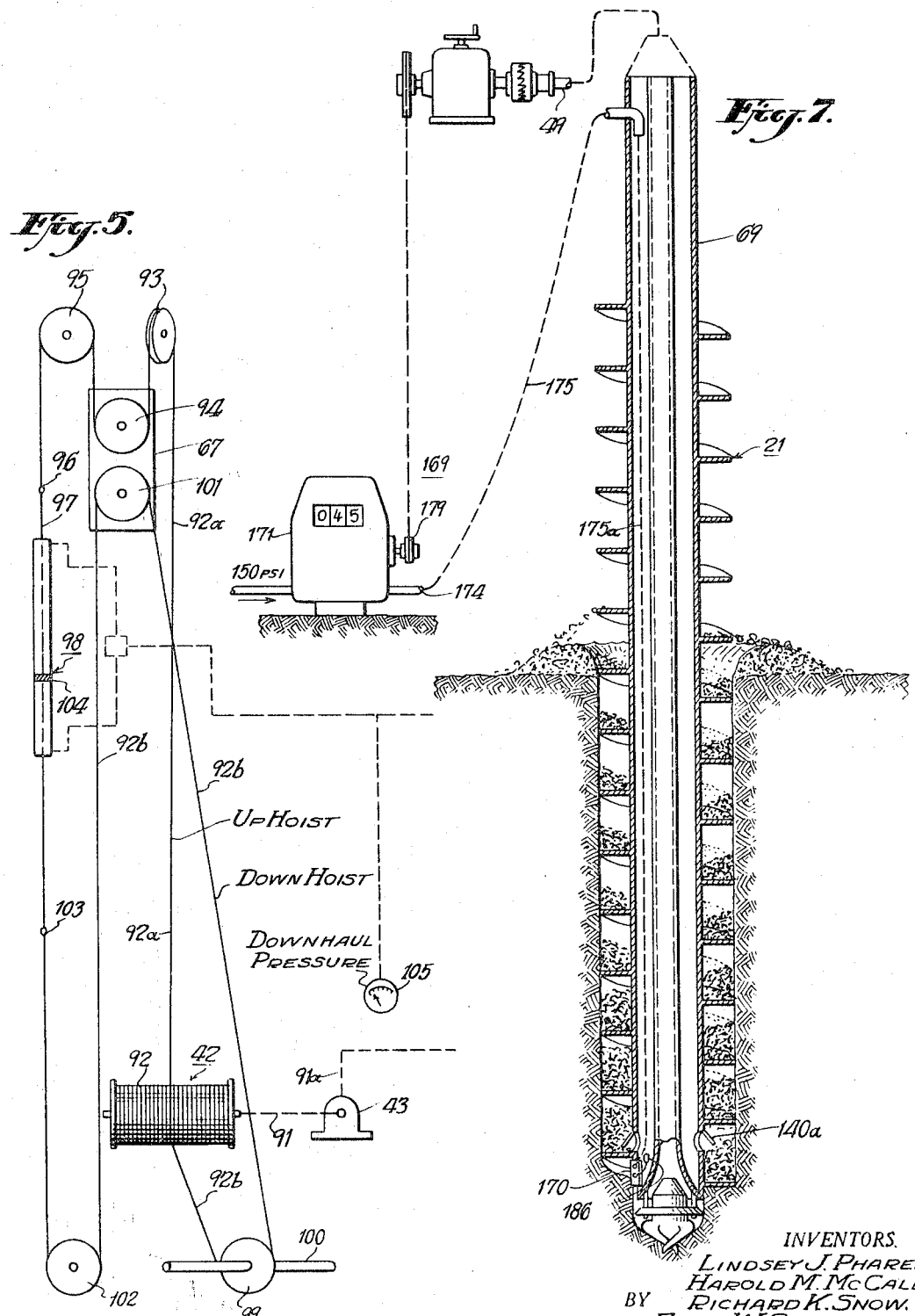

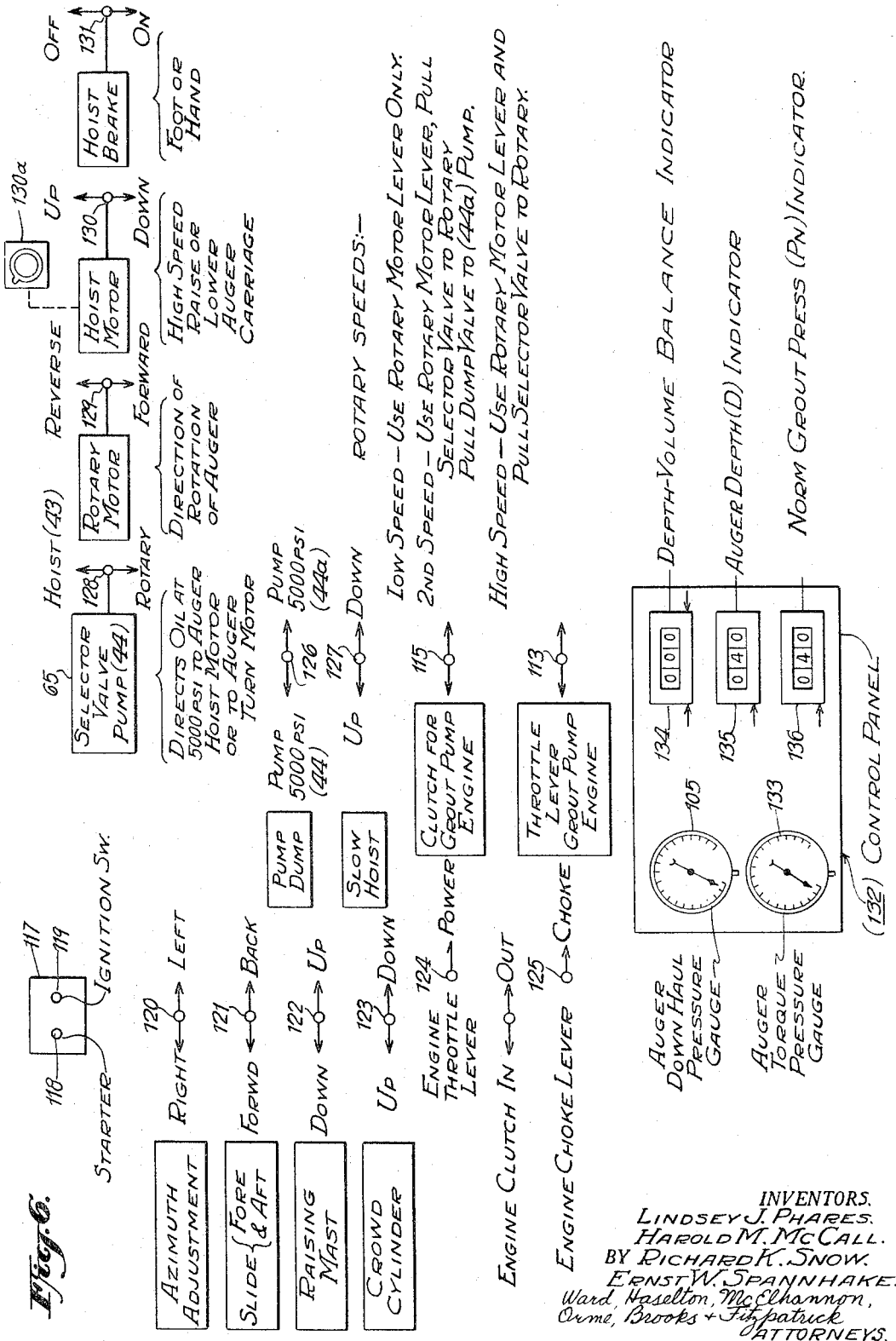

Jan. 31, 1967  L. J. PHARES ET AL  3,300,988
APPARATUS FOR FORMING PILES
Original Filed Dec. 23, 1960  11 Sheets-Sheet 5
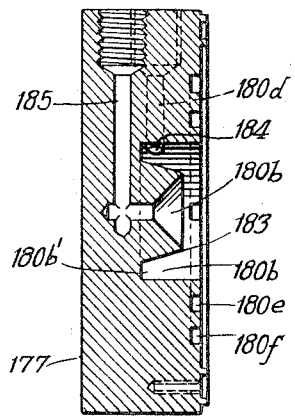
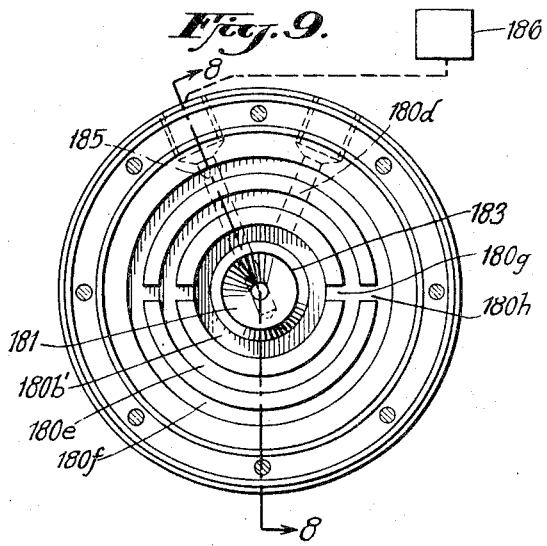
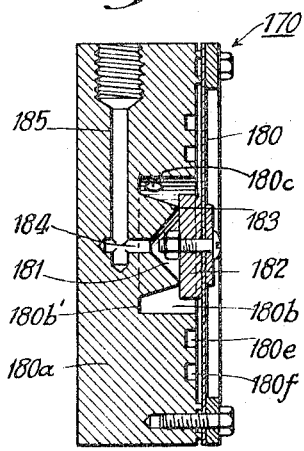
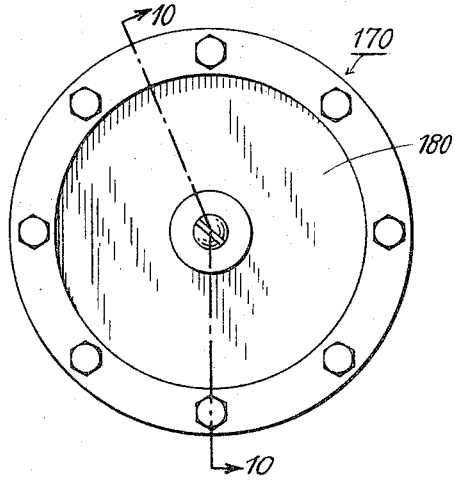
INVENTORS.
LINDSEY J. PHARES.
HAROLD M. MCCALL.
BY RICHARD K. SNOW.
ERNST W. SPANNHAKE.
Ward, Haselton, McElhannon, Orme, Brooks & Fitzpatrick
ATTORNEYS.

Jan. 31, 1967     L. J. PHARES ET AL     3,300,988
APPARATUS FOR FORMING PILES
Original Filed Dec. 23, 1960     11 Sheets-Sheet 6
*Fig. 12.*
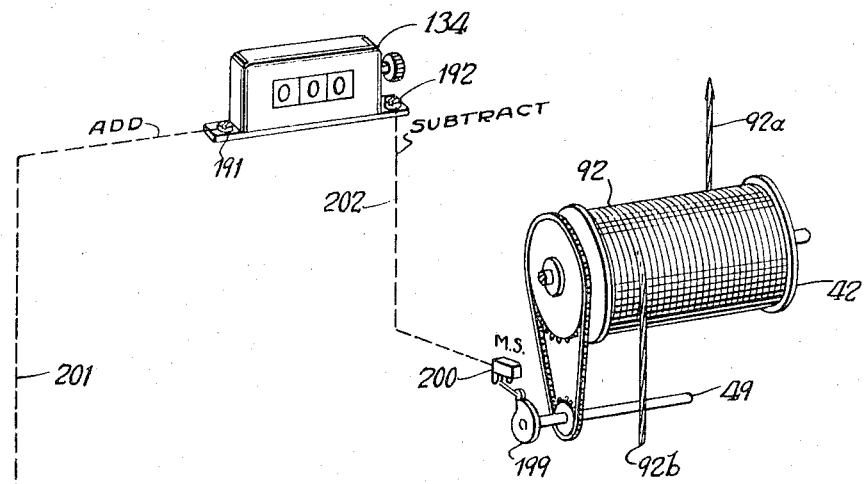
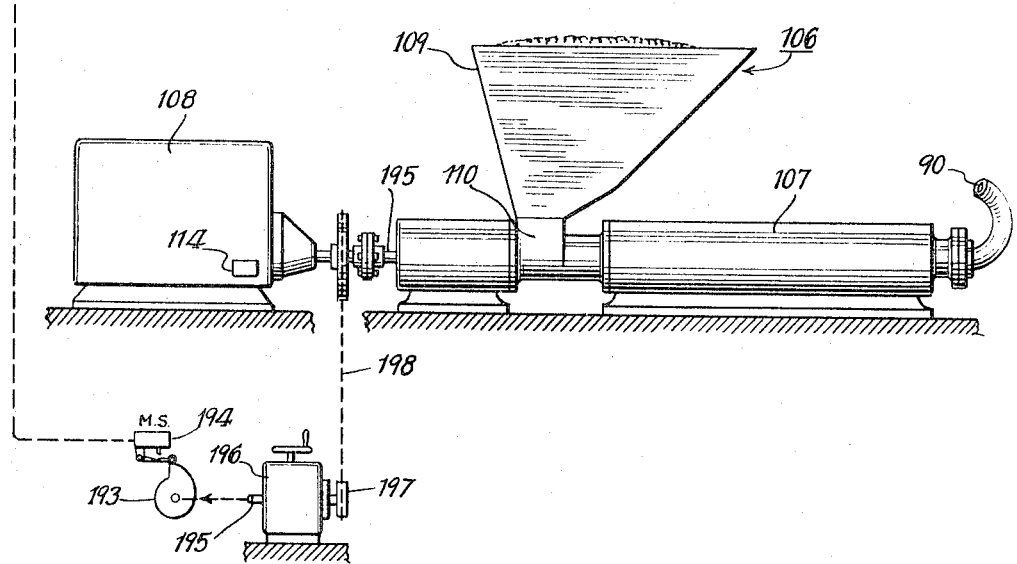
INVENTORS.
LINDSEY J. PHARES.
HAROLD M. McCALL.
BY RICHARD K. SNOW.
ERNEST W. SPANNHAKE.
Ward, Haselton, McElhannon, Orme, Brooks & Fitzpatrick
ATTORNEYS.

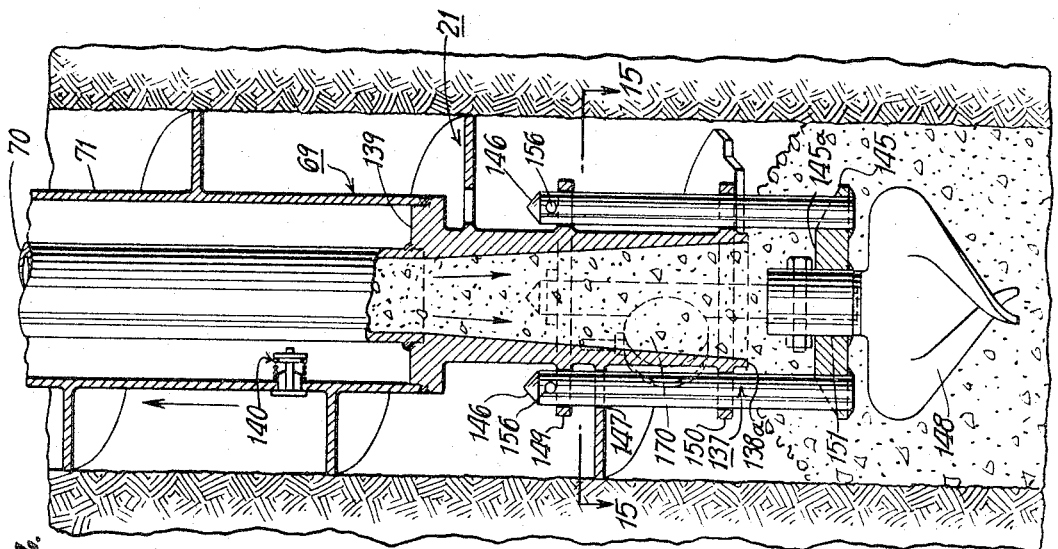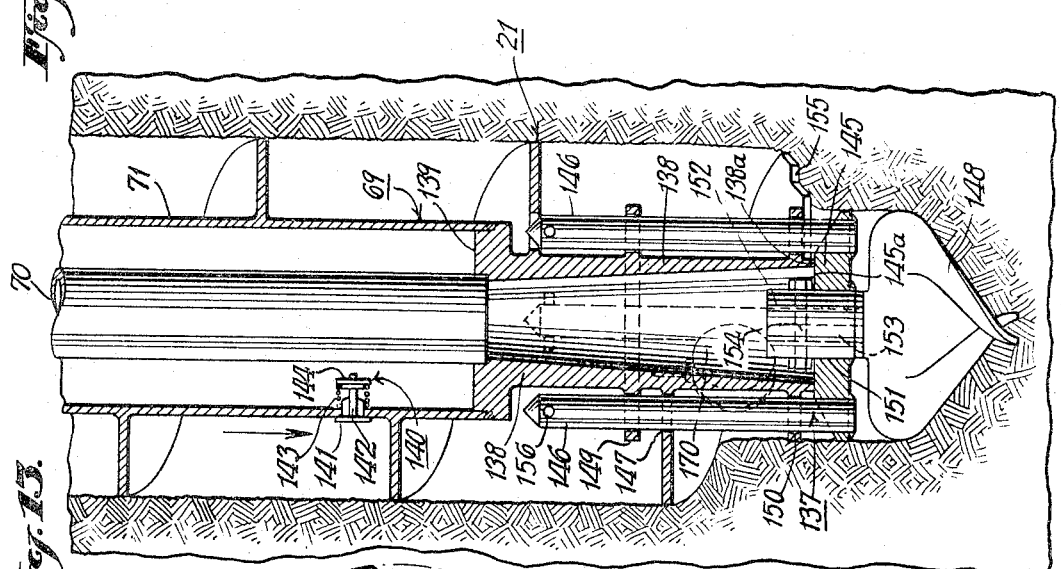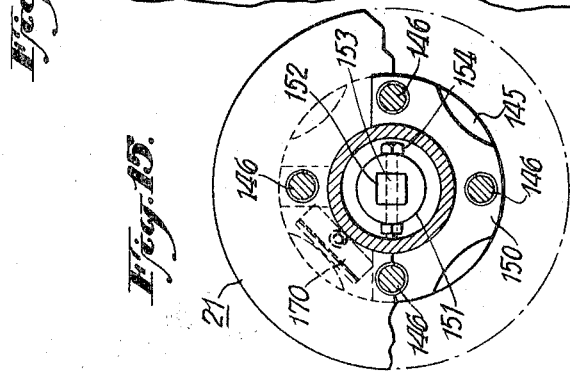

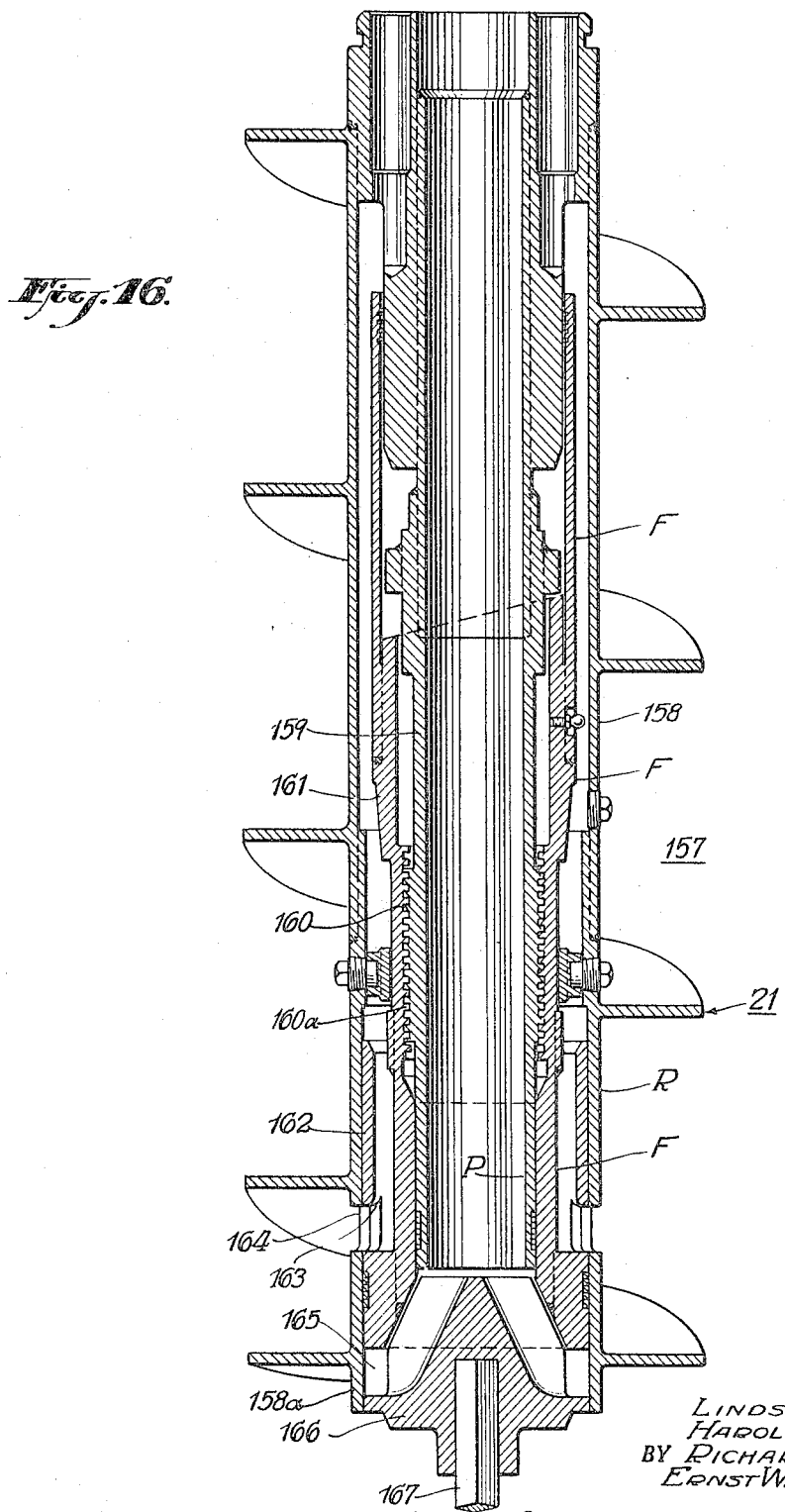

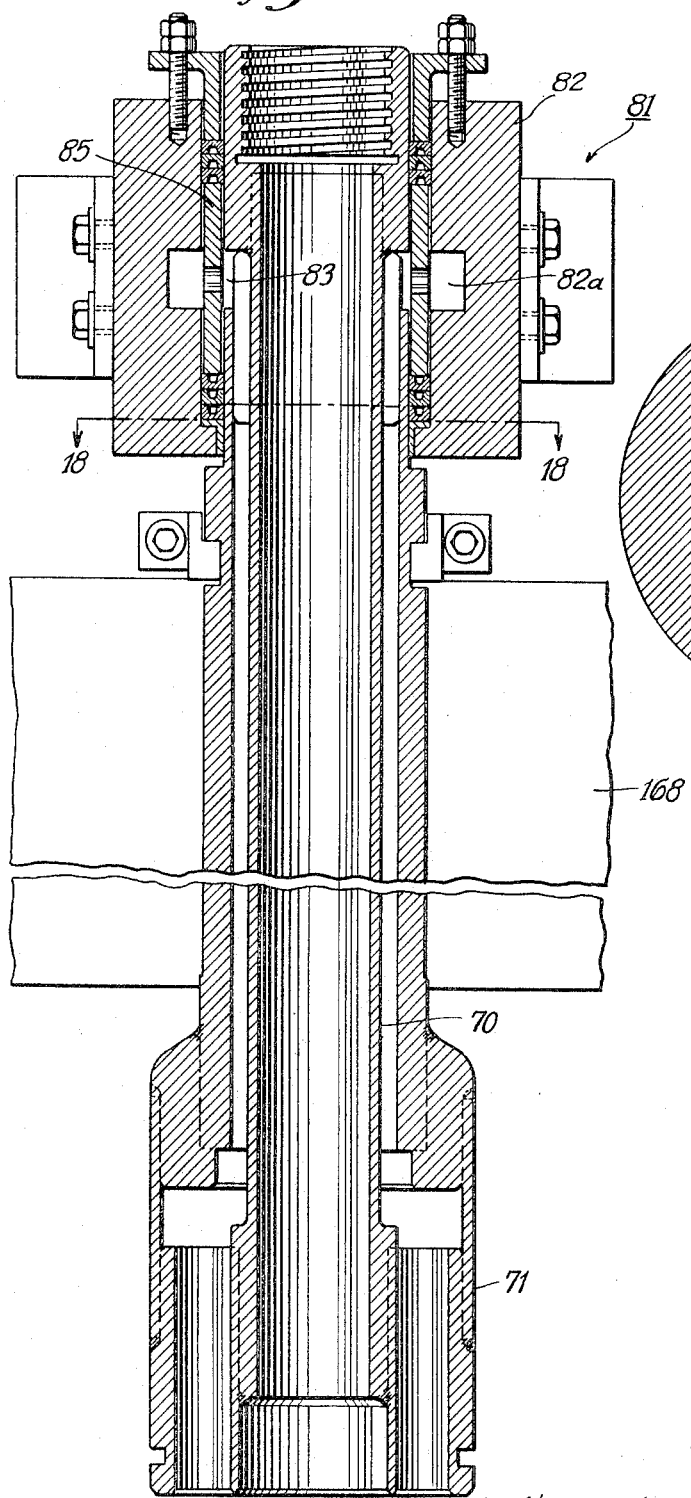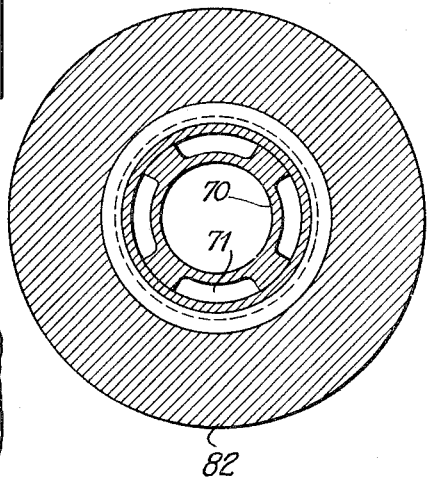

Jan. 31, 1967   L. J. PHARES ET AL   3,300,988
APPARATUS FOR FORMING PILES
Original Filed Dec. 23, 1960   11 Sheets-Sheet 10
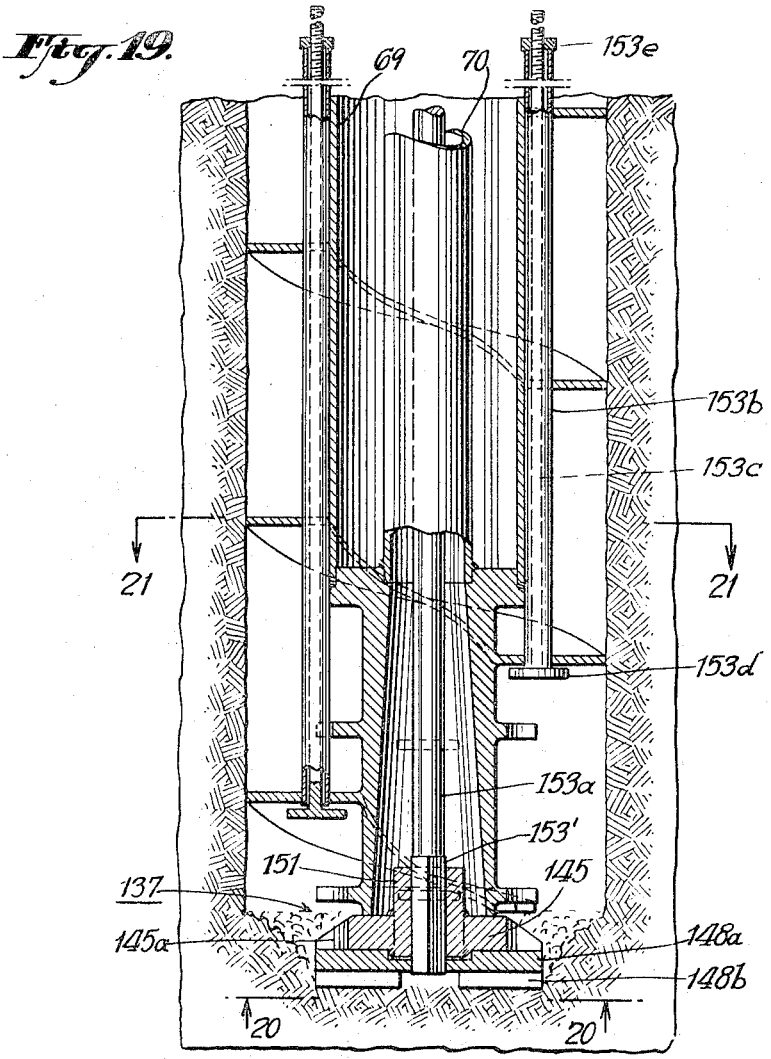
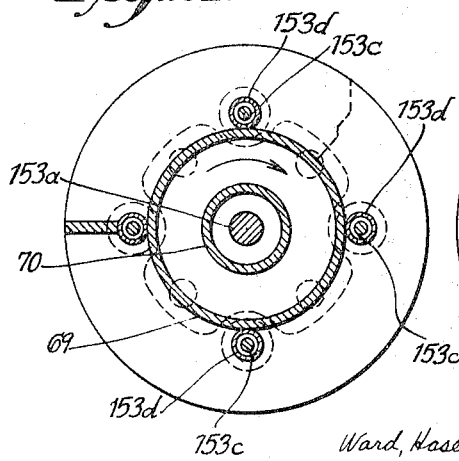
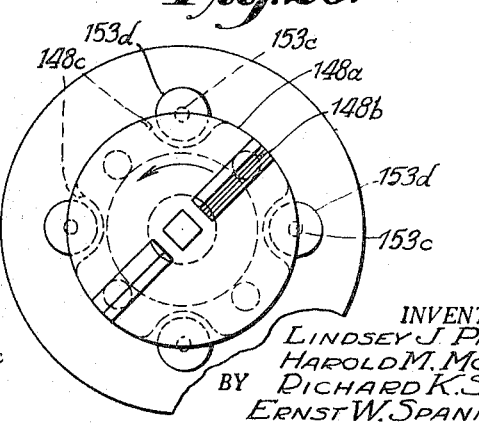
INVENTORS.
LINDSEY J. PHARES.
HAROLD M. MCCALL.
BY RICHARD K. SNOW.
ERNST W. SPANNHAKE.
Ward, Haselton, McElhannon, Orme, Brooks & Fitzpatrick
ATTORNEYS.

Jan. 31, 1967  L. J. PHARES ET AL  3,300,988
APPARATUS FOR FORMING PILES
Original Filed Dec. 23, 1960  11 Sheets-Sheet 11

INVENTORS
LINDSEY J. PHARES
HAROLD M. MCCALL
BY RICHARD K. SNOW
ERNST W. SPANNHAKE

Ward, Haselton, McElhannon, Orme, Brooks & Fitzpatrick
ATTORNEYS.

United States Patent Office 3,300,988
Patented Jan. 31, 1967

3,300,988
APPARATUS FOR FORMING PILES
Lindsey J. Phares, Butler, Harold M. McCall, Fair Lawn, Richard K. Snow, Westwood, and Ernst W. Spannhake, Butler, N.J., assignors to Raymond International Inc., New York, N.Y., a corporation of New Jersey
Original application Dec. 23, 1960, Ser. No. 77,973, now Patent No. 3,200,599, dated Aug. 17, 1965. Divided and this application Mar. 8, 1965, Ser No. 437,841
7 Claims. (Cl. 61—63)

This application is a division of copending application Serial No. 77,973, filed December 23, 1960, now Patent No. 3,200,599.

This invention relates to methods and apparatus for placing caissons or piles of the shell-less type in the earth by hollow stem auger drills by pumping a cementitious material, such as grout, through such stem into a cavity formed beneath the auger as it is withdrawn, together with the earth in its flights, from a hole in the earth which has been drilled by it. The invention more particularly relates to novel methods and apparatus for improving the quality of such piles, including the shape and strength thereof, by controlling and adjusting in a novel manner the pressures and volume of the cementitious material placed in such cavity during auger withdrawal.

Methods and apparatus of this general character in the prior art have failed to provide any suitable or accurate control and adjustment of pressures of the cementitious material in such a cavity beneath the auger.

Also such prior art methods and apparatus have failed to make the most economical use of such cementitious material by so failing to control and adjust the pressures of the material in the cavity beneath the auger.

Further, such prior art methods and apparatus have been relatively slow in forming such piles.

Also, the prior art has failed to provide adequate methods and apparatus for forming piles of the above character and concurrently placing therein reinforcing rods or bars.

One of the objects of the present invention is to overcome the above difficulties or to reduce same to insignificance.

Another object is to provide novel methods and apparatus for controlling and recording certain factors, such as the pressure of the cementitious material near the auger tip during the injection thereof thereby to demonstrate the quality of shell-less piles of this type.

A further object in one form of the invention is to sense and indicate that variable factor occurring during the formation of such piles which, by adjusting other factors such as drill rise rate and grout inflow rate, can be most advantageously controlled and adjusted to obtain high quality piles, namely, the pressure of the grout or other cementitious material at or near the lower end of the auger drill during drill withdrawal and injection of the grout, such pressure being controlled to follow preselected values during such drill withdrawal.

A further object is to provide novel methods and apparatus for forming a shell-less type pile of cementitious material which is capable of developing skin friction at least equal to that of a driven pile in certain types of earth, for example, wherein there occurs lateral protrusions of such material.

Another object is to provide novel methods and apparatus for avoiding in the cementitious material near the drill tip during drill withdrawal any substantial pressure variations from selected norm values.

Another object is to provide novel methods and apparatus for controlling the pressure of the cementitious pile-forming material as measured at the upper region of the cavity vacated by the rising auger drill, such pressure control providing a positive and accurate method and means for preventing a cave-in of the earth surrounding such cavity while making most economical use of such material.

A further object is to provide novel methods and apparatus for attaining and maintaining accurate control over the pressure of the cementitious mixture during the injection of the latter substance into the cavity beneath the auger during its withdrawal from the hole which has been drilled by it.

Another object is to provide novel methods and apparatus for controlling the speed of drill withdrawal.

A further object is to provide novel methods and apparatus for controlling the pressure conditions of the cementitious material which is injected into the cavity beneath the drill by correlating in a novel manner the volumetric inflow rate of such material into the cavity and the rate of withdrawal of the drill or auger to insure a selected pressure gradient in the upper region of such material as the drill is withdrawn, and also to insure that the pressure of the cementitious material at the region of the lower end of the drill comprises during drill withdrawal a selected function of the depth of such lower drill end during withdrawal.

A further object is to provide novel methods and apparatus for controlling the cementitious material pressure conditions in the cavity by integrating and correlating during drill withdrawal the total cementitious mixture flow (volume) with the total volume of the cavity.

A further object is to provide novel methods and apparatus for the control of the withdrawal of an auger drill from a hole drilled in the earth by it, such control being effected by servo means under the influence of the pressure of the substance injected into the cavity formed by the withdrawal of the auger from the hole.

A further object is to provide novel methods and apparatus for controlling the hoisting of the auger out of a hole in the earth drilled by it by sensing the pressure of the cementitious mixture in the hole and controlling and adjusting the hoisting in response to such sensed factor.

Another object is to provide novel methods and apparatus to insure adequate filling with cementitious material of the cavity beneath an auger drill during its withdrawal from a hole in the earth drilled by it by correlating in a novel manner the number of turns of a pump which forces such material into the cavity with the linear extent of drill withdrawal from the bottom of the hole.

A further object is to provide novel methods and apparatus to establish proper depth and load-carrying capacities of piles by sinking an auger drill to a depth where the torque required to drive same is at a value equal to the torque required to sink the auger for previous piles which have met satisfactory load tests.

A further object is to provide novel value apparatus for the lower end of such auger drill for controlling the flow of a drill medium, such as water or drill mud, and also for the control of the flow of a pile-forming material such as grout.

A further object is to provide a novel auger drill having means for keeping the drilling medium, such as water or mud, used in the augering of the pile separate from the cementitious mixture or grout employed in forming the pile.

A further object is to provide a novel valve structure employed at the lower extremity of a hollow stem auger which enables an operator at his discretion to stop and start a flow of a pile-forming substance from such lower extremity.

A further object is to provide a novel valve for the lower extremity of a hollow stem earth auger which valve is held shut by the downcrowding force applied to the auger stem during drilling into the earth with the auger, such valve being responsive to gravity and the pressure of a pile-forming material, such as grout, within the hollow stem of the auger at the start of the withdrawal or hoisting operation of the auger, the pile-forming material being directed toward the valve via the passage in such hollow stem which thus aids in pushing such valve open.

A further object is to provide a novel valve device for the lower extremity of an auger type earth drill wherein one of the movable valve elements mounts a cutter head for the drill, for example, a pilot bit, drilling torque being applied to such cutter head by novel mechanical means which serve the double purpose of transmitting such torque and holding in alignment the movable part of the valve.

The invention, in one aspect thereof, comprises a method for forming piles in the earth and consists in the steps of sinking an auger with a hollow stem into the earth to a selected depth, extracting the auger while pumping grout through the passage in the stem into the cavity below the auger to fill such cavity, and sensing the pressure of the grout at or near the lower end of the auger and regulating the rate of auger extraction in response to such sensed pressure to insure that such cavity filling occurs, such pumping of the grout into the cavity being at a substantially constant volumetric flow rate.

The invention, in another aspect thereof, comprises a method for forming piles in the earth and consists in the steps of drilling a hole in the earth by sinking to a desired depth an auger type drill by turning same, the drill being provided with a hollow tubular stem and spiral flights. After the drill has been sunk to the desired depth, it is progressively withdrawn from the hole, together with the earth in its flights by applying a lifting force thereto adequate for this purpose and thereby forming beneath the drill a cavity adapted to receive a pile-forming substance, such as grout. The volume of the cavity progressively increases as the drill is withdrawn and while it is so increasing the cavity is filled completely during drill withdrawal by forcing therein with the aid of a pump and via the hollow stem the aforementioned pile-forming substance. The rate of drill withdrawal and the volumetric rate of inflow of such pile-forming substance into the cavity are controlled to produce a changing pressure of the pile-forming substance as measured near the lower end of the drill, which changing pressure is a function of the changing level of the lower end of the drill as it is lifted out of the hole, and such controlling includes adjusting one or both of such rates to change the pressure of the cementitious mixture to a desired value in response to such pressure departing from desired norm values at selected levels of such lower drill end during its withdrawal.

The invention in a further aspect thereof comprises the method for forming piles in the earth which consists in drilling a hole in the earth by sinking an auger type drill therein by rotating same and after the drill has been sunk to a desired depth, exerting a lifting force on the drill adequate to lift it out of the earth thereby to form a cavity beneath the drill while concurrently forcing a cementitious mixture into the cavity at a substantially constant volumetric flow rate. While this is taking place there is sensed the changing pressures of the cementitious mixture near the lower end of the drill during the withdrawal of the latter and the changing pressures at such lower drill end are compared with selected pressure norms at selected stages or increments of withdrawal of the drill, and the speed of withdrawal of the drill is controlled and adjusted to cause the cementitious mixture pressures to be not less than such norms.

The invention in a still further aspect thereof comprises the method for forming piles in the earth which consists in turning an auger type of drill to sink same into and thereby form a hole of a desired depth in the earth, the drill having a hollow stem with a valve outlet at the lower end thereof (the valve being closed during drill sinking) and thereafter exerting a force in an upward direction on the drill while concurrently forcing under pressure into the cavity created beneath the drill, and via said hollow stem, a cementitious mixture of pile-forming material, the force acting on the drill being adequate to raise the drill out of the earth together with the earth in its flights thereby to withdraw same from the hole. During such drill withdrawal, there is provided a primary series of signals indicating the injection via such stem into the cavity of a corresponding series of increments of selected volume of such cementitious mixture, and also there is provided a secondary series of signals indicating the occurrence of a corresponding series of successive selected linear increments of drill rise, each producing an added increment of volume of the cavity selected substantially to accommodate such volumetric increments of the cementitious mixture injected into the cavity. The raising of the drill and the injection of the mixture are controlled so that for each such primary signal there occurs substantially concurrently one of the second signals.

The above and further objects and novel features of the present invention will more clearly appear from the description set forth below when the same is read in connection with the accompanying drawings which are submitted herewith for purposes of illustration only and which do not define the limits of the invention, reference for this latter purpose being had to the appended claims.

In the drawings:

FIG. 1 is a side elevation of an apparatus comprising a truck-borne drill rig embodying one form of the present invention;

FIG. 2 is a schematic representation of the apparatus shown in FIG. 1, but with the drill, namely, a hollow stem auger, penetrating into the earth, there being also shown apparatus for directing a cementitious mixture, such as grout, into the hollow stem of the auger;

FIG. 3 is a schematic representation, partly in section and with parts broken away, showing a crown assembly of the auger drill employed in FIGS. 1 and 2 and embracing the mount for the auger drill at its upper extremity, such crown assembly being adapted for vertical movement as guided by a mast of the drilling rig;

FIG. 4 is a schematic representation of a portion of means employed in the present invention for sensing the pressure of the cementitious material near the drill tip and comparing it with a norm;

FIG. 5 is a schematic representation of the manner in which a hoisting cable of the present invention is associated with the crown assembly for raising and lowering the auger drill thereof, said arrangement being referred to as a reaving diagram for the hoisting apparatus;

FIG. 6 is a diagram of the several control means and indicators available to the operator of the apparatus embodying the present invention in the form of FIGS. 1 and 2;

FIG. 7 is a schematic representation of apparatus for sensing the pressure of the cementitious mixture, such as grout, at the lower extremity of the drill and for comparing such sensed pressure with a selected norm pressure, a portion of this apparatus being shown in FIG. 4;

FIG. 7a is a graphical comparison of a norm grout pressure gradient and grout pressure sensed at or near the lower drill end during drill withdrawal;

FIG. 8 is a vertical sectional view, partly in section and with parts broken away, of a portion of a differential diaphragm pressure sensitive device which is employed near the lower extremity or tip of the drill as shown in FIG. 7;

FIG. 9 is a front elevation of the parts shown in FIG. 8 but also showing schematically a check valve connected thereto;

FIG. 10 is a vertical sectional view, partly in section and with parts broken away, of such differential diaphragm device, a part of which is shown in FIG. 8 and which embodies a valving device for aiding in sensing the pressure as aforementioned;

FIG. 11 is a front elevtaion of the parts shown in FIG. 10;

FIG. 12 is a schematic representation of one form of apparatus for integrating and comparing factors representing the total volume of the cementitious mixture pumped into the cavity beneath the drill and the total volume of such cavity as the drill is withdrawn from the hole which it has drilled in the earth;

Figure 22:
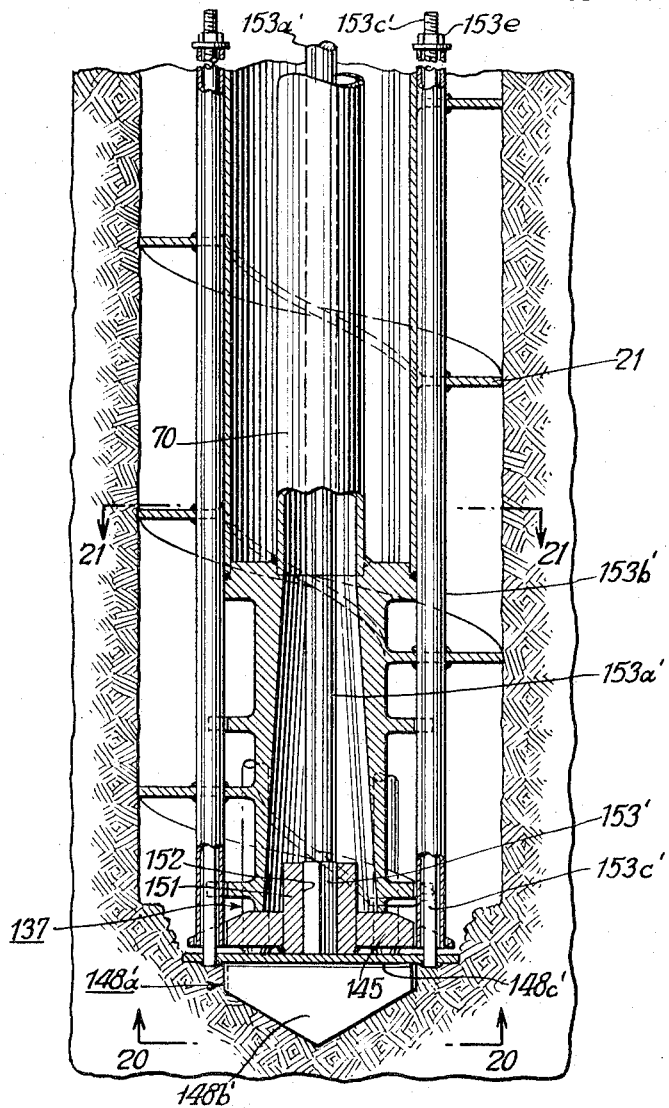
Figure 24:
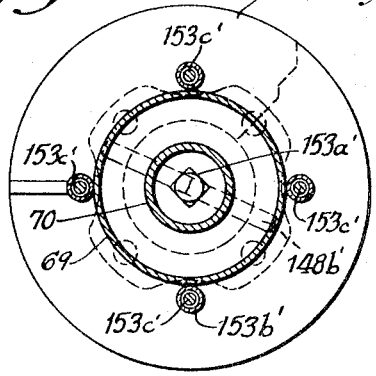
Figure 23:
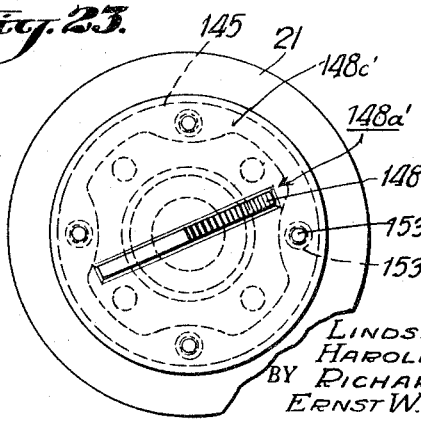

FIG. 13 is a side elevation, partly in section and with parts broken away, of one form of the lower extremity of the hollow stem auger drill employed in the present invention and showing a valve in such stem for controlling the flow of the cementitious mixture, such as grout, the lower extremity of the auger being shown at the bottom of a hole which it has drilled, the value being shown in its closed condition, there being a down pressure exerted upon the lower tip or end of the auger as during the hole drilling process;

FIG. 14 is a view of the parts shown in FIG. 13 but with the auger drill being withdrawn from the hole and wherein the down pressure on its lower extremity is relieved and by virtue of the weight of an axially movable lower valve portion the aforementioned valve for the grout or cementitious mixture is open allowing it to flow through the valve and into the cavity beneath the drill during withdrawal;

FIG. 15 is a sectional view taken substantially along lines 15—15 of FIG. 14;

FIG. 16 is a side elevation, partly in section and with parts broken away, of the lower extremity of a drill or drill stem employed in the present invention and showing another form of valve construction embracing valves for controlling the flow of both the cementitious mixture and the drilling medium, e.g. water;

FIG. 17 is a vertical sectional view, partly in section and with parts broken away, of an upper portion of the auger drill which portion includes a water swivel assembly and comprising a showing of two concentric tubular portions of the stem of the auger and means for directing water into one of such passages by means of a relatively stationary collar which is in communication with a rotating portion of the drill stem;

FIG. 18 is a sectional view taken substantially along line 18—18 of FIG. 17;

FIG. 19 is a side view, partly in section and with parts broken away, of a modification of the auger construction shown in FIG. 13 and illustrating means for placing one or more reinforcing bars;

FIG. 20 is an end elevation of the parts shown in FIG. 19;

FIG. 21 is a sectional view taken substantially along line 21—21 of FIG. 19; and FIGS. 22, 23 and 24 illustrate a modification of FIGS. 19, 20 and 21.

Referring to the drawings in greater detail, with particular reference to FIGS. 1–4, the apparatus embodying the form of the invention therein shown is broadly designated at 20 and comprises a mobile drill rig including an auger type earth boring drill 21 which is suspended rotatably from its crown by means of a crown assembly 22 which is mounted for vertical movement with the aid of suitable rails of a mast 23, such rails, for example, being shown at 24 and 25.

The mast 23 is mounted for pivotal movement (between vertical and horizontal positions) about a shaft 26, such shaft being mounted upon a carrier truck 27 by means of two pairs of arms 28, 29 and 30, 31, the latter pair not being shown in FIG. 1.

The pairs of arms 28, 29 and 30, 31 in turn are mounted upon a shiftable deck 32 which in turn is mounted upon the back 33 of the truck 27.

Normally the deck 32 mounting the arms 28, 29 and 30, 31 is held rigidly in place for drilling, but such deck can be adjusted in position and shifted fore and aft of the truck along a horizontal center line through, for example, a selected distance, such as two or three feet, by means of a suitable slidable mounting (not shown). This sliding movement is controlled by a pair of hydraulic slide cylinders 34, only one of which is shown in FIG. 1.

The shiftable deck 32 also can be angularly shifted about a vertical axis through a selected angular distance, for example, ±40° with respect to its norm centered position, by means of a pair of hydraulic cylinders 35, again only one of which is shown in FIG. 1.

The mast 23 is provided with cylindrical auger guides 36 and 37. The latter by suitable reaving means (not shown) is positioned midway between the auger crown and the mast bottom.

Further, the mast 23 can be raised and lowered by means of a pair of hydraulic mast raising cylinders 38, one of which is one each side of the mast. Each of such mast raising cylinders is operatively associated with the mast, as shown in FIG. 1, the righthand extremity of the cylinder thereof being secured to the arms 29 and piston 39 of each being connected to the mast as by a pivoted joint 40.

For purposes of providing stability to the drill rig while drilling, a pair of hydraulic jacks 41, one on each side of the rig thereof, is provided, these jacks being shown in their extended condition in FIG. 1.

The hydraulic jacks 41 are mounted upon extendable outrigger devices (not shown) for the purpose of increasing the distance between them when desired and thus enhancing drill stability.

The means for raising and lowering the auger 21, as shown in FIG. 1, includes a cable drum assembly 42 which will be described in greater detail hereinafter. This cable drum assembly is operatively associated with the crown assembly 22 of the auger by a system of cables which will be described in connection with FIG. 5. The cable drum assembly 42 is driven, in the form shown, by means of an hydraulic motor 43 which receives hydraulic fluid, such as oil, from one or more hydraulic pumps 44. In FIG. 1 only a single hydraulic pump 44 is shown although we have found it advantageous in this form of the invention to employ two such pumps which may be connected individually or jointly to the hydraulic motor 43. For purposes of simplicity the hydraulic interconnections between the pumps 44 and the motor 43 are not shown.

The hydraulic motor 43 is operatively connected to the cable drum assembly 42 by a suitable power multiplying means, in this form comprising two pairs of sprocket wheels 45, 46 and 47, 48. The pair 45 and 46 are respectively of large and relatively quite small diameter and are coaxially mounted upon a jack shaft 49. The sprocket wheel pair 47, 48 respectively of relatively large and small diameters are in the form shown mounted coaxially with the pivot shaft 26 of the mast 23.

The hydraulic motor 43 is operatively connected to the sprocket wheel 45 by a suitable roller chain 50 and in turn the smaller sprocket 46 is drivably connected to the larger sprocket 47 by a roller chain 51, and the sprocket 48 is connected to a sprocket 52 of the cable drum assembly by means of a roller chain 53.

The aforementioned hydraulic pump 44 is capable of generating high pressure, for example, 5000 p.s.i. (oil) and this is employed for the heavy work required to be done by the apparatus, for example, energizing the hydraulic motor 43 and also for energizing an hydraulic motor which turns the auger 21 located in the crown assembly 22 and which will be described more fully hereinafter.

One or more additional hydraulic pumps, such as 54, are provided for activating, e.g., mast raising cylinder 38 and power cylinders 34 and 35. In the form shown, two such hydraulic pumps 54 are employed. The hydraulic pumps 44 and 54 are substantially in alignment with one another as shown in the form of FIG. 1. Such pumps are driven by any suitable power source, for example, an internal combustion engine 55 which drives same by means of a main pulley 56 which is, by means of endless belts, drivably connected to a pump drive pulley 57, the latter in turn via universal couplings 58 and 59 directing torque to such pumps 44 and 54. On the opposite side of the rig, as viewed in FIG. 1, a similar pair of pumps, such as 44 and 54, are located and are similarly driven.

In order to support mast 23 when in its inactive horizontal position, there are provided a pair of vertically extending posts 60 and 61 which are mounted respectively upon the forward portion of the deck 32 and the front of the truck 27, which posts are provided with bifurcated upper elements or cradles, as at 60a and 61a respectively, for supporting the mast as aforementioned when the latter has been lowered under the influence of the hydraulic mast raising and lowering power cylinder 38.

Secured to a vertical mounting plate 62 are three hydraulic valves 63, 64 and 65 which respectively perform the following functions:

(a) Valve 63— This valve controls the auger drive motor (to apepar more fully hereinafter) located in the crown assembly 22 at the top of the auger 21. The latter motor is sometimes referred to as the "rotary drive motor."

(b) Valve 64— This valve controls the cable drum drive motor 43.

(c) Valve 65— This valve is a so-called selector valve which is capable of directing oil or some suitable hydraulic medium either to said auger drive motor in the crown assembly 22 or to the auger hoist motor 43.

The valves 63, 64 and 65 are under the control of suitable manually operable levers as will be described in connection with FIG. 6. The valve 64, in addition to being controlled by a manually operable lever, as will be described in connection with FIG. 2, is also controlled by a servo mechanism responsive to pressure measured at or near the lower extremity or tip of the auger as will be described more fully hereinafter. The aforementioned hydraulic system is provided with an oil reservoir 66.

For purposes of clarity, the system of hydraulic conduits are not shown in connection with FIG. 1 or in connection with FIG. 6, although a portion of such conduits are shown in FIG. 2 in a schematic manner, it being understood that the system of hydraulic conduits in the present apparatus is laid out in any suitable manner to achieve the specified functions of the apparatus.

Referring now to FIG. 3, there will be described the portions of the apparatus comprising the crown assembly 22 aforementioned. Such crown assembly 22 is schematically shown in FIG. 3 and comprises a crown frame or mounting 67 upon which the various elements comprising same are mounted. These elements embrace hydraulic motor 68 which is designed for turning the auger 21 via a suitable operative interconnection which will now be described:

The auger 21 is provided with a hollow stem 69 consisting, in the form shown, of two concentric coaxial tubes, the center one 70 for conducting the cementitious mixture or grout from the top of the auger to the drill tip thereof and thence into the cavity drilled in the earth; and an outer tube 71 for the purpose of conducting the drilling medium, such as drill mud or water to the lower end of the drill. The stem 69, thus comprises a hollow tube to which are rigidly secured the helical flights of the auger.

Suitable bearing means comprising thrust bearings and weight supporting bearings are provided for the auger, such bearings being schematically indicated at 72.

The hydraulic motor 68 transmits torque to the stem 69 of the auger 21 via a pair of bevel gears 73 and 73a, the latter comprising a bevel gear of substantial diameter which is horizontal in attitude, as shown in FIG. 3, and which meshes with the bevel gear 73, the latter being substantially vertical as shown in this figure.

Thus the shaft of the bevel gear 73a is in effect the stem 69 of the auger. Shaft 74 of the bevel gear 73, on the other hand, is perpendicular to the axis of the stem 69. A suitable power multiplying device consisting of a series of sprocket wheels interconnected by suitable roller chains drivably connects the hydraulic motor 68 to the shaft 74 as follows:

A sprocket wheel 75 is driven directly by the motor 68 via an output shaft thereof and such sprocket wheel 75 in turn drives a pair of coaxial sprocket wheels 76 and 77 which are rigidly secured to a common shaft 78, the driving thereof being accomplished via a roller chain 78a. The sprocket wheel 76 is of substantially larger diameter than that of 77. The latter in turn is drivably connected to said shaft 74 via a further sprocket wheel 79 of substantially larger diameter than that of 77, this connection being accomplished via a roller chain 80. It is, of course, understood that the shafts 78 and 74 are suitably mounted upon the crown frame 67. Via the bevel gear 73a rigidly secured to the stem 69, torque is communicated to the auger 21 to turn same and thereby to sink the drill into the earth as shown in FIG. 2.

The drilling medium, such as water or drilling mud, is communicated to the outermost of the two conduits, namely, the tube 71 aforementioned, via a device referred to as a swivel 81 and consisting of a relatively stationary collar 82 which is mounted upon the frame 67, and which surrounds a portion of the tube 71 having an orifice 83 therein through which the drilling medium passes into such tube 71. The drilling medium is conducted to the swivel 81 via a conduit 84 at a selected pressure and from a suitable source. A suitable packing or gland construction, as at 85, is provided for preventing leaking of the drilling fluid despite the rotation of the rotating stem 71.

The cementitious mixture, such as grout or pumpable concrete, in turn is communicated to the hollow stemmed auger drill via a swivel 86 having a stationary collar portion 87 which is associated with the rotatable inner conduit 70 via a gland or packing 88 thereby to prevent leakage of the cementitious mixture as it is pumped under pressure into such conduit 70. The stationary portion 87 of the swivel 86 in turn is in communication with the source of the cementitious mixture under pressure via a rigid conduit 89 which is secured to a flexible conduit 90 by a suitable joint. As the crown assembly 22 moves up and down vertically during the operation of the apparatus, the cementitious mixture and the drilling medium are communicated thereto via the flexible conduits 84 and 90 respectively thereby avoiding the disadvantage of having to mount containers of these substances upon the vertically movable carriage or frame 67.

Referring now to FIG. 5, there will be described the means for raising and lowering the crown assembly 22, such means being designed for the purpose not only of applying a hoisting or lifting force to the auger, but also a force referred to as a down-crowding force by which the auger is urged into the earth forcefully, that is, by force other than that attributable to the weight of the auger and its crown assembly 22.

The cable drum assembly 42 (FIG. 5) is operatively connected to the hydraulic motor 43, via an interconnection 91. The cable drum assembly 42 or hoist drum has wound about it a hoisting cable 92, an uphoist portion 92a of which passes respectively over a crown sheave 93 (mounted on mast 23), under a cable sheave 94 mounted on the crown assembly frame or carriage 67 and thence over another crown sheave 95 (also mounted on mast 23) and thence to the upper extremity 96 of a vertically movable piston 97 of a crowd cylinder 98 which is rigidly secured to the mast 23 as shown in FIG. 1. The portion 96 comprises a link between the uphoist portion of the cable 92a and the piston 97. On the other hand, a downhoist portion 92b of the cable 92 passes over a fleeting sheave 99 which is rotatable upon a shaft 100 having a stationary axis.

From the fleeting sheave 99 the downhoist cable portion 92b passes over a crowd cable sheave 101 which is mounted for rotation upon the rear of the crown frame 67 of the auger drill and from thence the cable portion 92b passes downwardly, as viewed in FIG. 5, and under a downhoist sheave 102 which is mounted for rotation upon the lower region of the mast 23 about a stationary axis. From such sheave 102 the downhoist cable portion 92b is secured, as by link 103, with the lowermost extremity of the piston 97 of the crowd cylinder 98.

The function of the crowd cylinder is to provide a fine adjustment to the positioning of the auger with respect to its vertical movement or, if desired, it can provide additional up or down force by the application of fluid under pressure on the proper side of a piston 104 thereof. The crowd cylinder piston may have a travel, for example, of ±4 feet from its central location or a total range of about 8 feet.

The hydraulic motor 43 turning the hoist drum 42 thus can lift the auger or it can exert a down force thereon.

In order to obtain an indication of the downhaul or downhoist pressure, there is connected to conduit 98a (FIG. 5) a downhaul pressure gauge 105. Such gauge may be employed not only for measuring downhaul pressure but also uphoist pressure as exerted by the crowd cylinder 98.

Referring now to FIG. 2, there is shown at 106 the pumping means for the cementitious mixture, such as grout, such pumping means comprising: a pump 107 which may be constructed in accordance with the apparatus shown in U.S. Patent No. 2,796,029, and a suitable pump drive 108. In this instance the pump drive comprises an internal combustion engine. The cementitious mixture is mixed in a hopper 109 and fed by means of the conduit 110 in the bottom thereof into the inlet of the pump 107.

To the outlet of the pump 107 there is secured by a suitable joint the lowermost extremity of the flexible conduit 90 which is connected to the swivel 87 of FIG. 3.

The internal combustion engine or power drive for the pump 107 is provided with a suitable speed control schematically indicated at 111 and a clutch as at 112. The speed control 111 embraces a hand lever or throttle 113 which is connected by suitable means to a carburetor 114 of the engine 108.

The clutch 112 in turn is controlled by a hand lever 115 which, via a clutch control means 116, governs the aforementioned clutch 112.

Referring now to FIG. 6, there will be described the manually controllable levers and handles at the control station for the apparatus and also the instruments which are immediately visible to the operator.

The internal combustion engine 55 has a starter and ignition control panel at 117 embracing a starter button 118 and an ignition switch 119.

On the lefthand portion of the control station there are provided four levers 120, 121, 122 and 123 which are respectively movable in the direction of the arrows shown and for the following purposes:

Lever 120—For controlling the azimuth or angular adjustment of the deck 32 under the influence of the hydraulic power cylinders 35. An adjustment of ±40° from the centerline of the truck can be made by lever 120.

Lever 121—For controlling the fore and aft sliding motion of the deck 32 under the influence of hydraulic cylinders 34 and whereby fine adjustments in the positioning of the auger drill can be made along such fore and aft line. By a joint control of the hydraulic cylinders 34 and 35 the auger drill can be accurately placed.

Lever 122—This lever controls the flow of hydraulic fluid under pressure to the hydraulic mast raising cylinder 38 thereby to raise or lower same.

Lever 123—This lever controls the hydraulic fluid under pressure to the crowd cylinder 98 (FIG. 5) to provide fine adjustments in positioning of the auger to aid in positioning its crown assembly, for example, for joining sections of the auger together or alternatively it can be used to aid in downcrowding the auger during drilling or to hoist same when it is to be lifted out of the earth.

The internal combustion engine 55 is under the influence of throttle lever 124 and engine choke lever 125.

The internal combustion engine 108 for the cementitious mixture pump 107 is under the influence of the throttle lever 113, as described above, and also under the influence of the clutch control lever 115, both of these levers being preferably positioned within easy reach of the operator of the apparatus.

Main hydraulic levers 126 and 127 are employed which are respectively:

(a) for directing oil to the selector valve 65 from either the pump 44 (FIG. 1) or a second pump 44a (not shrown), each of these pumps being capable of delivering fluid under 5000 p.s.i.; and (b) for controlling the hoist under slow conditons.

A lever 128 is provided for directing the high pressure hydraulic fluid from e.g., the pump 44 either to the hoist hydraulic motor 43 or to the drill drive or rotary hydraulic motor 68 in the crown assembly 22.

A lever 129 can be moved either to the reverse condition or the forward condition, as shown in FIG. 6, this lever controlling the direction of rotary motor 68 and thus governing the direction of angular motion of the auger 21. When the lever 129 is in the forward position, the hydraulic or rotary motor 68 causes the auger to drill into the earth in a downscrewing direction and when the lever 129 is in the reverse positon, the reverse is true.

A lever 130 controls the direction of rotation of the hoist motor 43.

A hoist brake (not shown) is under the control of a lever 131 which is movable either by foot or by hand to the "off" or "on" positions.

There is positioned in a location convenient and easily visible to the operator a control panel 132 at which there is localized the several instruments which should be under examination by the operator and including the aforementioned auger downhaul pressure gauge 105 and also an auger torque pressure gauge 133, the latter reflecting the torque exterted by the rotary auger turning motor 68 and connected as schematically shown in FIG. 2.

Also on the control panel are: A depth-volume integrator indicator 134, the operation of which will be explained hereinafter; also an auger depth indicator 135; and a grout or cementitious mixture desired or norm pressure indicator 136.

The operative interconnection of the several instruments on the control panel will be set forth more fully hereinafter in connection with the description of the system shown in FIG. 2.

As aforementioned, in the preferred form of the present invention, the auger is of the hollow stem variety having therein two passages, one for the cementitious mixture or grout and another for the drilling medium, such as mud or water. Preferably the drill steam is divided into two coaxial passages one of which embraces the other as has been described above in connection with FIG. 3. That is, the central conduit or tube 70 is for the passage of the grout or cementitious mixture and the second conduit 71 comprising a coaxial and embracing tubular member is for the water or other drill medium. It is possible for the functions of these passages to be reversed and for the center one to conduct the drill medium and the outer one the cementitious mixture in which event valve means therefor are employed at the lower drill end to accommodate such change.

The present invention employs a novel grout valve or cementitious mixture valve, it being understood that whenever the expression "grout" is employed herein there is embraced cementitious mixture. The grout valve is designed in such a way that during the sinking of the auger drill into the earth such valve is closed and there is thus prevented the escape of any grout from the lower end of the auger. However, during the drilling the drilling fluid, such as water, is directed into the excavation as the drill is sunk into the earth, for example, by increasing the pressure therein to a point adequate to overcome one or a plurality of poppet valves which are arranged in the outer surface of the conduit 71 and as shown in FIG. 13.

In the present invention the grout valve is constructed so that when the drilling is underway the central grout conveying passage is sealed and thus prevented from being plugged by the earth as the drilling proceeds, but on the other hand is constructed in such a way that when the auger is hoisted out of the earth and withdrawn the grout valve is automatically opened to permit the escape of the grout or other cementitious mixture thereby to fill the cavity formed beneath the auger.

This is well illustrated in FIGS. 13–15 which show a preferred form of grout valve employed at the lower extremity of the drill in the present invention, such valve being in its closed condition as shown in FIG. 13 and in its open condition in FIG. 14.

Thus in FIG. 13 there is shown the lower extremity of the auger 21 employing a preferred form of grout valve 25 designated in general by the numeral 137 and embracing the following construction: to the lowermost extremities of the coaxial tubes 70 and 71 there is secured as by welding a flanged tubular element 138 having an upper collar or flange 139 which performs the function of closing the bottom extremity of the drill medium passage namely the conduit existing between the inner tubular member 70 and the outer tubular member 71. Thus the flange 139 prevents the progress of the drilling fluid such as water past the upper surface of such flange 139 it being possible for the water or other drilling medium to escape from the lower region of the auger, e.g. via one or more poppet valves one of which is shown at 140. Such valve 140 includes a valve plate 141 having a valve stem 142 the latter being urged inwardly to force resiliently the plate 141 against the outer surface of the outer stem 71 with the aid of a poppet valve spring 143 which is interposed between the inner surface of the tube 71 and a poppet washer 144 secured to the stem 142. The poppet valve can be adjusted to open in response to any desired fluid pressure within the conduit 71. Alternatively any suitable form of valving arrangement can be employed for permitting the water or drill medium to escape from the lower end of the auger but yet prevent the entrance of soil to plug the drill medium conduit. For example, a one way flap or check valve 140a (FIG. 7) can be employed which is hinged to tube 71 in such a location that when the auger is turned the hinge is in the leading position and when the auger has stopped rotation the drilling medium can escape by pressing against the hinged flap.

Reverting to the flanged tubular member 138, in FIG. 13 it is shown that this member comprises an extension of the grout or cementitious mixture conduit 70, such tubular member 138 having an outwardly belled or outwardly flaring cross-sectional area to inhibit the formation of grout or cementitious plugs at the lower extremity of the drill. Thus, the cross-sectional area of the grout passage gradually is increased starting from the upper extremity of the tubular member 138 and ending at the lower extremity which coacts with a grout valve plate 145. The upper face of the grout valve plate 145 is shown at 145a and coacts with the lowermost annular edges 138a of the tubular member 138 thereby to close the valve and prevent the escape of the grout during drilling in the manner shown in FIG. 13.

The grout valve plate 145 is axially movable with respect to the tubular member 138 by virtue of a plurality of vertical cylindrical posts 146 of suitable metal, there being four employed in the embodiment shown separated by 90° intervals, such posts being rigidly secured about the margin of the grout valve plate 145 as by welding. Such posts pass through aligned passages, as at 147, formed in the helix of the auger 21.

A further function of the vertical posts 146 is to communicate torque to a cutter head 148 which is secured to the grout valve plate 145. This is accomplished by means of a pair of perforated collars 149 and 150 which are horizontal in attitude as shown in FIG. 13 and which have aligned passages through which pass the four vertical posts 146, there being suitable clearance to permit free axial movement of such posts, thereby to permit relative axial movement of the cutter head 148 when the drill is hoisted as will be described hereinafter.

The cutter head 148, in the form shown, is of the fishtail variety although any suitable type of cutter head may be employed.

The cutter head 148 is secured to the grout valve plate 145 as follows: such valve plate 145 has passing centrally therethrough a cylindrical collar 151 which is rigidly secured to such plate as by welding and which is also provided with a passage 152 therethrough of square cross section which is well shown in FIG. 15. The hollow collar 151 thus is adapted to receive a square stud or post 153 which is secured rigidly to the cuter head 148, the square post 153 being secured within the collar 151 as by a bolt 154 which passes diametrically through both. The cutter head 148 thus is removable for substitution of varying types of cutting heads as desired.

Thus torque communicated to the auger 21 is communicated to the cutter head 148 via the tubular element 138, the perforated collars 149, 150 and the four vertical posts 146 which in turn cause the grout valve plate 145 to rotate and thence to communicate the turning force to the cutting head via the interfitting parts 151 and 153 above described.

The length of the posts 146 and the disposition of the perforations through which they pass and also the shape of the tubular member 138 are such that the grout valve plate 145 can fit closely against the lowermost surface 138a of the element 138 to assume the positions shown in FIG. 13 during the sinking of the auger.

It will be noted in FIG. 13 that the helical surfaces of the auger 21 proceed down to the cutting edge 155 which is the lowermost edge of the helix and which is immediately above the axially shiftable grout valve plate 145. The outermost diameter of the fishtail cutter head 148 is substantially equal to the outermost diameter of the collar 150. Such diameter of the fishtail cutter head is somewhat greater than or at least equal to the outer diameter of the grout valve plate 145.

Referring to FIG. 14, the auger 21 instead of being urged downwardly as at FIG. 13 is undergoing a hoisting or uplifting motion and this has caused an opening of the grout valve 137 by virtue of grout pressure within tube 70 and the weight of the cutter head 148 and the parts thereof which may shift axially therewith including the grout valve plate 145, and the several posts 146. The relative axial movement of the grout valve plate 145 is limited by means of limit-stop pins 156, there being one each in the upper extremities of each of the vertical metal posts 146 and each of which coacts with the upper surface of the perforated collar 149 to prevent the detachment of the cutter head 148 and its valve plate 145 attached thereto. The degree of opening of the grout valve 137 is selected to be adequate for the desired maximum flow rate of the grout, bearing in mind the constituents thereof, the outermost margin of the plate 145 preferably being tapered upwardly as viewed in FIG. 14 to facilitate the exit of the grout or other cementitious mixture in the manner shown in such FIG. 14.

The auger construction of FIGS. 19–21, inclusive, will now be described, it being similar to that of FIGS. 13–15, inclusive, with the exceptions set forth. This construction is for the purpose of installing concurrently with the injection of the cementitious material a reinforcing bar centrally of the pile and, if desired, one or more bars radially spaced from and preferably symmetrically situated about such center. This is accomplished by employing an expendable cutter head 148a having, for example, two radially extending cutter fins 148b, such expendable cutting head being separable from the valve plate 145 and having secured centrally thereto a stud 153' which is of square cross-section and analogous to the stud 153 of FIG. 13, such stud 153 having integrally secured thereto and extending coaxially thereabove a reinforcing rod or bar 153a which extends to any desired height up into the tube 70, for example, high enough to be above ground level when the drill is fully withdrawn from the earth. The reinforcing bar 153a may be of square cross-section, the same as the stud 153', or, as shown, it may be of circular cross-section. In any event, the cross-sectional shape and size of the bar 153a is selected to be easily slidable through the central passage formed in the collar 151.

The aforementioned cutting head or drill bit 148a being expendable, may be of an inexpensive variety.

The pile is drilled in the manner set forth above using the bit 148a and the downcrowd force during augering holds it firmly as shown against the bottom face of the valve plate 145, the bit tending to keep the stem on center.

Thus when the hole has been drilled to its final depth, as above described, and the grout pump started, the grout valve 137 will be opened by the combined action of gravity and grout pressure acting on the plate 145. This will move the expendable drill bit 148a and its reinforcing bar 153a downwards with respect to the stem of the drill. The central portion of the stem during injection of the grout will cause the bit 148a to remain in place at the bottom or point of the pile, such bit 148a firmly anchoring the reinforcing bar 153a at the point of the pile. The movement of the grout through the tube 70 during withdrawal of the drill tends to hold the reinforcing rod 153a positioned in the desired centered location. The injection of the grout or other cementitious material continues while the drill is withdrawn until the drill stem is clear of the ground level at which time the lower extremity of the stem is lifted off of any remaining portion of the reinforcing rod 153a which protrudes above ground level.

Also, if desired, in addition to or in lieu of installing the central bar 153a as above, one or more additional reinforcing bars can be analogously installed concurrently with the injection of the grout, which additional bars are radially spaced from the center of the pile and close to the pile outer surface. Often pile reinforcing specifications require the use of such multiple reinforcing bars in such radially spaced positions so as appreciably to increase the bending strength of the pile.

Such reinforcing bars radially spaced from the center of the pile are placed as follows: along the outer surface of the drill stem 69 (which, for example, may be of 8-inch outer diameter) there is located one or more hollow guide tubes 153b, each of which extends from near the lower end of the helix along the sides of such stem 69, one such guide tube being provided for each reinforcing bar which is to be placed. In the form shown in FIGS. 19–21 there are four such guide tubes 153b for receiving four reinforcing bars 153c which are spaced about the longitudinal axis of the auger separated by 90° intervals. Each such guide tube 153b is terminated at the end region of the auger helix, the mouth of each such tube opening upon the lower face of the last turn of the helix. For example, a lowermost mouth of a guide tube is preferably located at or near the lowermost portion of the helix and the next lowermost mouth of a guide tube is located on the underside of the helix but spaced upwardly therefrom to the extent of 90° of the helix, and so on.

The lengths of the guide tubes 153b correspond substantially to the lengths of the reinforcing bars 153c therein. For example, in the case of a pile requiring reinforcing in its upper 20 feet, the pile being, for example, 30 feet in depth, such guide tubes 153b will be approximately 20 feet long. The bars 153c are inserted into the aforementioned lowermost mouths of the tubes 153b. Each such bar is provided at its lower extremity with a flat washer or disc 153d which functions to prevent it from being pushed up inside the tube 153b during drilling. At the upper extremity of each bar 153c there is provided a sufficient protrusion above the top of its respective tube in order that a pin, such as 153e, can be inserted in a passage through the bar in order to rest on the top lip of the tube 153b to prevent the dropping out of the bar until the desired time. The pile, which may be of any length, then is drilled employing the apparatus of FIGS. 19–21, and while the auger is being withdrawn, in order to release the reinforcing bars 153c, it is necessary to wait until the top portions of such bars are exposed above ground level in order that the pins 153e may be removed. Thereafter, if desired, in order to start the dropping out of the bars, each may be struck a blow upon the top thereof, as by a hammer, to aid its slipping out of its respective tube as the auger is further withdrawn from the hole. The start of such drop-out of bars 153c can be concurrent with or later than that of bar 153a. The guiding action on the tubes 153b keeps such bars equally spaced insuring their accurate location in the pile. Substantially semicircular portions of the valve plate 145 are cut away (FIGS. 19 and 20) respectively as at 145a to permit the dropping out of the reinforcing bars 153c.

Referring now to FIGS. 22, 23 and 24, there is there shown a modification of FIGS. 19, 20 and 21 which is identical thereto except that reinforcing bars 153c' (FIG. 22) instead of terminating just beneath the helix 21, in the manner of bars 153c (FIG. 19), extend therebelow through perforations in the valve plate 145 and down to a bottom plate 148c' of an expendable drill bit 148a', to which they are secured as by welding. Reinforcing bar guide tubes 153b' (FIG. 22) therefor are also downwardly continued whereby they extend down and loosely through such perforations in valve plate 145 and terminate preferably just beneath the lower surface thereof (FIG. 22) when the valve is closed. In contrast to FIGS. 19–21, in the modification of FIGS. 22–24, the release or drop-out of all the reinforcing bars 153a' and 153c' commences concurrently because all of such bars are secured to the same bottom plate, namely, 148c'.

An alternative form of valve structure is shown in FIG. 16 which is referred to as a grout-water valve in view of the following construction: during the downscrewing or sinking of the auger into the earth a grout valve is closed and a water or drill medium valve is open, but when the auger has been sunk to depth it is reversed two revolutions which causes the grout valve to open and the theretofore open water valve to close.

Such alternative form of construction of FIG. 16 is broadly designated by the numeral 157 and consists of an outer stem tube 158 and an inner stem tube 159. The latter is for conducting the grout to the tip of the drill and the space between the latter and the inside surface of the stem tube 158 is for conducting the drilling medium such as water. These two tubes are relatively fixed and do not shift axially relative to one another.

The lower outer surfaces of the inr hollow stem 159 is provided with a plurality of threads as at 160 which engage with threads 160a upon the inner surface of a valve sleeve 161 which can undergo relative angular movement thereby to shift axially relative to the tubes 158 and 159.

The valve sleeve 161 is provided with drilling medium valve surfaces 162 coaxial with its lower region the latter having orifices 163 for moving into register with orifices 164 in the lowermost portion of the outer tube 158 as shown in FIG. 16. Thus during the downscrewing of the auger 21 the drilling medium can escape from the lower portion of the drill via the registered orifices 163 and 164, this by virtue of the relative axial position of the parts as shown in this figure.

However, during such downdrilling the grout valve is closed this valve comprising a skirt portion 158a along the lowermost periphery of the tube 158 such skirt closing grout orifices 165 during this condition. Such grout orifices are formed in a grout valve plate 166 to which is secured a pilot bit (not shown) having a shaft 167 of square cross section which is fitted into a central passage in such plate 166.

After the auger has been sunk to depth by turning same in a downscrewing direction, thereafter, it is turned, for example, two revolutions in an upscrewing direction thereby causing the following operation: the pilot bit being embedded in the earth will cause the valve sleeve 161 to be angularly relatively stationary to the angularly shifting portions 158 and 159 which are turned backward in an upscrewing direction through the aforementioned two revolutions. This will cause the threads 160, 160a to coact thereby in effect to unscrew a portion of the auger and to shift the valve sleeve 161 in such a way that the drill medium orifices 163 and 164 are no longer in register but rather are out of register, the orifices 164 being closed by the cylindrical portion 162. On the other hand, the grout valve orifices 165 are opened by virtue of the raising of the skirt portion 158a relative to plate 166 in response to the unscrewing motion of the auger drill.

Referring now to FIGURES 17 and 18, there are shown in somewhat greater detail certain portions of the apparatus as shown schematically and described in connection with FIGURE 3. Thus the water swivel 81 of FIGURE 3 is shown in greater detail in FIGURE 17 and comprises the above described relatively stationary collar 82 having an annular passage or groove formed internally thereof at 82a to which is directed the drilling medium which finds its way into the drilling medium conduit 70 via the passage 83 as shown. The details of the gland or packing 85 are also shown in this FIG. 17.

In the region designated 168 (FIG. 17) is located the so-called "rotary table" by which torque is communicated to the auger stem via the bevel gear arrangement 73, 73a described above in connection with FIGURE 3.

*Grout Pressure Control Method and Means*

Referring now to FIGURES 2–4, inclusive, and 7–12, inclusive, there will now be described certain of the novel control methods and means embodying the present invention.

In the placing of grout piles by means of an earth drilling auger with the use of prior methods and apparatus there has been no adequate means or methods provided for correlating the rate of withdrawal of the drill or auger with the volumetric inflow rate of the cementitious mixture, and also to control adequately the pressure of the cementitious mixture in the cavity which is vacated by the drill. Prior apparatus and methods of this type have failed to provide any adequate information as to the conditions regarding these factors occurring during the forming of the pile.

One of the principal objectives of the present invention is to provide novel methods and apparatus for maintaining preselected pressures of the grout or cementitious mixture column, as measured near the auger and during withdrawal, at least great enough to prevent the drilled hole from closing in or caving in. Successful installation of piles of this type, which are formed by filling with grout the cavity vacated by the auger as it is extracted from the earth, requires a knowledge of pressure conditions of the grout in the cavity, preferably grout pressure conditions in the region of the lower extremity of the drill.

Accordingly, in the present invention there is provided a pressure sensing system broadly designated 169 (FIGS. 2, 4 and 7) having a pressure sensing element 170 for sensing the pressure of the grout in the lower region of the auger drill. The position of the sensing element 170 is well shown in FIGS. 7 and 13. It is operatively associated with means at the operator's station (FIG. 6) for indicating when the grout pressure in the neighborhood of the lower end of the drill, falls below a selected value which value is different for each level of such drill end.

We have found it desirable in one form to employ a substantially constant volumetric inflow rate of the grout or cementitious mixture onto the cavity via the stem, and while withdrawing the auger to control and adjust the rate of withdrawal so that the pressure of the grout in the region of the lower end of the drill will not fall below or appreciably below the selected norm for each level of withdrawal of the drill tip as per FIG. 7a. For example, at a depth of 40 feet of the drill tip it is desirable for the grout pressure to be 40 p.s.i., and at a drill tip depth of 20 feet for the grout pressure to be say 20 p.s.i.

The grout pressure indicating means, in one form of the present invention, which signals to the operator of the apparatus the departure of the grout pressure below a selected norm at each level of withdrawal, is of the pneumatic variety and is illustrated in connection with FIGS. 4 and 7. In effect the means of FIG. 4 comprises a pressure comparator device with a signal means, and is of the following construction and operation: the pressure comparator device is indicated by the numeral 171 (FIG. 4) and comprises an element 172 into which is directed, via a pneumatic infeed line 173, air at a selected constant feed pressure of say 150 p.s.i. The element 172 causes small charges of this high pressure (Pf) of air to be directed through an exit port 174 to a conduit 175 which is in communication with the aforementioned pressure sensing element 170, the conduit 75 and the element 170 comprising the system connected to such exit port. Operatively connected to the element 172 is a signal device 176 which, for example, can emit an audible signal, although the invention is not limited to any particular type of signal. However, in this instance the signalling device is of the audible variety and each time the element 172 emits a charge or a pulse of the high pressure input air the signal means 176 is actuated to make one signal, e.g. to ring a bell once.

In between these pulses of such high pressure air (Pf) there is made a comparison between: (a) a desired pressure norm (Pn) as shown on an indicator 177, and (b) the grout pressure (Pg) as measured by element 170, the comparison being made pneumatically via an element 178. The indicator 177, as shown in FIG. 4 shows a norm pressure of 45 p.s.i. This indicates the norm pressure (Pn) against which a comparison is made with the pressure (Pg) in the system 175, this comparison being made by the coaction of the elements 172 and 178.

The element 172 continues to discharge the pulses of high pressure air (e.g. at 150 p.s.i.) at intervals until the pressure in the system 170, 175 reaches the preselected norm pressure which is set or adjusted, as by a wheel 179 which is operatively connected to the indicator 177 for changing the setting thereof to accord with the desired norm, and also is operatively connected to the comparator element 178. When the pressure in the system 170, 175 reaches the desired norm the signal means 176 ceases to operate.

The frequency of the audible signals from 176 is a function of the degree of departure of the pressure (Pg) in the system 170, 175 from the desired norm (Pn) and as the desired norm is approached the frequency becomes lower and lower until eventually it becomes zero indicating that the pressure in the system 170, 175 is not below the norm.

The conduit 175, which places in communication the pressure sensing element 170 with the pressure comparator 171, is of a flexible nature, as indicated in FIG. 7, between the exit port 174 and the top of the auger, there being a suitable swivel joint communicating the pressure medium to a portion 175a of the conduit which is located within the water passage of the stem 69 of the auger 21.

The pressure sensing element 170 in effect is a differential pressure diaphragm device the details of which are shown in FIGS. 8–11 with particular reference to FIG. 10. In the latter figure the pressure differential diaphragm device embraces a diaphragm proper 180 the periphery of which is secured tightly to a diaphragm cup 180a having a primary chamber 180b therein which is in communication with the lower extremity of the conduit 175 via a port 180c and a passage 180d. The primary chamber 180b of the pressure differential diaphragm device 170 is separated from a secondary chamber 181 which is coaxial therewith and positioned interiorly of the chamber 180b as is shown in FIGS. 8, 9 and 10. Such primary and secondary chambers are normally separated from one another by means of a valve plate 182 which coacts with a valve seat 183 of ring-like or annular shape comprising the line of demarcation between the primary and secondary chambers 180b and 181. The valve plate 182 is secured to the diaphragm 180 and can shift into and out of engagement with the valve seat 183 in response to certain pressure differentials existing between the primary chamber 180b and the pressure acting upon the righthand face of the diaphragm 180 as viewed in FIG. 10.

The primary chamber 180b embraces not only a relatively deep portion 180b', as shown in FIGS. 8 and 9, but also concentric and relatively more shallow portions 180e and 180f which comprise annular grooves formed concentric with the two coaxial and concentric primary and secondary chambers 180b and 181. The concentric grooved portions 180e and 180f are in communication with one another via radially extending passages 180g and 180h (FIG. 9).

Thus the air pressure in the element 172 (Pg) is symbolic of or representative of the pressure in the primary chamber 180b.

Since the exterior face of the diaphragm 180 is exposed to the cementitious mixture or grout at the upper region of the cavity, by virtue of its location near the lower end of the drill, such cementitious mixture exerts pressure against the righthand face of the diaphragm 180, as mentioned above, and if such grout pressure exceeds that of the air pressure within the primary chamber 180b the valve plate 182 will be pressed against the valve seat 183. Thus if a desired grout pressure at the particular level of the pressure sensing element 170 should be 45 p.s.i., for example, by virtue of a 45 foot penetration of the drill and such grout pressure is in fact 45 p.s.i. or greater, then the valve 182, 183 will be closed. Assuming that it has been closed for an adequate period and also that 45 p.s.i. has been set as the norm upon the pressure comparator 171 (FIG. 4) via the wheel 179, then the audible signaling device 176 will be inoperative because the pressure in the system 170, 175 is not less than the norm.

However, if during withdrawal of the stem, and during the injection of the grout into the cavity beneath the auger, the latter is withdrawn at too fast a rate (the grout then being fed at a substantially constant volumetric inflow rate) then the grout pressure will drop and if it falls below the preselected minimum value for the given depth of the auger, as adjusted by the wheel 179 upon the pressure comparator, the air pressure within the primary chamber 180b will exceed that on the righthand face of the diaphragm 180 and the valve 182, 183 will open thereby permitting the theretofore trapped air in chamber 180b to exhaust into the secondary chamber 181, and thence via an escape port 184 and a passage 185 (FIG. 9) to a check valve 186 thereby permitting the pressure within the chamber 180b to drop to a value approaching atmospheric pressure. At this point the pressure comparator device 171 will immediately start functioning and the signal device 176 will be activated to emit audible signals at a substantial frequency dependent upon the degree of drop of the pressure below the norm and immediately the operator of the device, by controlling the hoist motor lever 130, or a vernier control therefor 130a (FIG. 6) will slow down the rate of withdrawal of the auger. In the meantime the pressure comparator device 171 will attempt to rebuild the pressure in the system 170, 175 thereby causing the aforementioned audible signals to continue. The pulses of the infeed air (Pf) will continue intermittently into the system 170, 175 until the external grout pressure, that is the pressure sensed by the righthand face of the diaphragm 180, is restored to the selected norm (resulting from the slowing down of the drill withdrawal rate) at which time the audible signal means 176 will become inactive.

We have found it advantageous to employ in connection with an auger of for example, 16" outer diameter, 1 p.s.i. of air pressure for every foot of depth of penetration of the drill. That is the grout or cementitious mixture is injected into the cavity at the 40-foot level under a pressure equal to or greater than 40 p.s.i. Thereafter it is possible manually to reduce the setting of the indicator 177 via the adjusting wheel 179, for example, 5 p.s.i. for each 5-foot increment of withdrawal. Alternatively as shown in FIGURE 2, the adjusting wheel 179 is operatively associated with means for changing same exactly to accord with the level of withdrawal of the lower end of the drill. For example, the adjusting wheel 179 is operatively connected to the jack shaft 49 by an operative interconnection schematically indicated at 187 in which there is interposed a reducing gear 188 to correlate the revolutions of the jack shaft 49 with the upward movement of the auger 21.

Thus the pressure comparator device 171 is automatically adjusted to accord with the level of withdrawal of the auger 21.

As shown in FIG. 2, there is provided in one form of the invention a servo mechanism 189 which is operatively connected to the engine throttle lever 113 for the grout pump engine, and also to the hoist motor lever 130, which controls the hydraulic valve 64 of the hydraulic motor 43, to accomplish the following: assuming that it is desired to feed into the cavity grout at a constant volumetric inflow rate, the servo mechanism 189 is operatively connected to the pressure comparator and signaling device 171, by means of an operative interconnection schematically shown in 190, in such a way that when the signaling device 176 is activated the servo mechanism will alter the setting of the lever 130 thereby to slow down the auger as a function of the frequency of the signals. That is, the hoist motor control lever 130 will be adjusted to provide a norm rate of withdrawal which can be adjusted in a negative direction to slow down the drill withdrawal rate within a selected small range for example, 1 foot per minute which may constitute 10% of the total rate of withdrawal of the drill and by such slowing down will automatically reinstate the desired grout pressure at the region of the lower end of the drill.

Alternatively, the volumetric inflow rate of the grout can be increased via the servo mechanism 189, or either one or both of these factors, namely, the rate of withdrawal of the drill or the volumetric inflow rate of the grout can be adjusted to reinstate the desired pressure at the lower end of the drill.

Thus, the novel method carried out by the above described apparatus with particular reference to the pressure comparator device 171 is as follows: (1) drilling a hole in the earth by sinking to a desired depth an auger type drill by turning same, said drill having a hollow tubular stem and spiral flights; (2) thereafter progressively withdrawing the drill from the hole, together with the earth in its flights, by applying a lifting force, e.g., to the upper end thereof adequate for this purpose and thereby forming beneath the drill a cavity adapted to receive a cementitious mixture via said hollow tubular stem, such cavity being of a volume which progressively increases as the drill is withdrawn; (3) while filling said cavity completely during such drill withdrawal by forcing therein via the stem the cementitious mixture; and (4) while controlling the rate of drill withdrawal and also the volumetric rate of inflow of cementitious mixture into the cavity to produce a changing pressure of such cementitious mixture, as measured at the region of the lower end of the drill, which changing pressure is a function of the changing level of such lower drill end as it is lifted out of the hole, such controlling including adjusting one or both of such rates to increase such cementitious mixture pressure in response to such pressure falling below a desired value at a selected level of such lower drill end during its withdrawal. Of course, such controlling of the rates also can be exercised for the purpose of reducing the pressure of the cementitious mixture in response to such pressure reaching a value in excess of the desired value at the selected level of the drill tip. However, as aforementioned, it is the preferred practice in one form of the invention to inject the cementitious mixture into the cavity via the hollow drill stem at a constant volumetric inflow rate and to regulate the pressure as sensed at the drill tip by controlling the rate of drill withdrawal, that is in particular by slowing down the rate of withdrawal to restore the pressure of the cementitious mixture at the drill tip when it falls below the selected norm pressure for that particular level of withdrawal.

*Volume-Depth integrating method and apparatus*

Referring now to FIGURES 2 and 12 there will be described the method and apparatus for correlating the extent of upward movement of the drill during injection of the cementitious mixture with the volume of such mixture actually injected into the cavity. Thus there is correlated by this novel method and apparatus the extent of upward movement of the drill, as measured from the greatest depth of drill penetration, with the total flow of the cementitious mixture. Such correlation insures that such total flow of cementitious mixture is always at least equal to or slightly greater than the volume of the cavity produced by the withdrawal of the drill, such cavity volume being represented by the extent of upward movement of the drill at any instant during the period of withdrawal.

We have found it desirable to employ this novel method and apparatus for integrating and comparing the total volume of the cementitious mixture pumped with the volume of the cavity vacated by the drill in order to insure a slight over filling of the cavity, sometimes referred to as an over grouting. Such over grouting is desired and is considered advantageous because the auger often rotates in a slightly eccentric manner and produces a cavity in the earth which in volume is slightly in excess of the volume of the cylinder surrounding the external surfaces of the flights of the auger. For example, we have found that by virtue of slight eccentricities in the motion of the auger during drilling that the actual volume of the cavity produced may be say 15 to 25% greater than the actual theoretical volume of the cylinder surrounding the flights of the auger. Thus it has been found advantageous to select an arbitrary percentage of over grouting for example 25% and to insure that for each increment of volume of the cavity as determined by a selected increment of drill rise, that there shall be a volume of cementitious mixture injected therein which is slightly greater than the theoretical volume of the cavity increment, say by about 25%.

Such integration of the grout volume and comparison thereof with the integrated cavity volume may be accomplished by the employment of an add-subtract counter device wherein one unit is added to the counter for each increment of drill rise, (representing cavity volume) and one unit is subtracted from the counter for each corresponding volumetric increment of cementitious mixture injected into the cavity. By maintaining the counter at a constant value, for example zero, by controlling the rate of drill rise (the volumetric inflow rate of the grout being maintained constant) it is possible to maintain a desired balance between these volumes.

Thus the novel method embraces the sinking of the auger drill having a hollow stem to the desired depth and thereafter withdrawing same while filling the cavity vacated by the drill with the cementitious mixture pumped into it via the hollow stem and during such withdrawal: (a) integrating the extent of drill movement, e.g., for every 0.19' drill rise adding one unit to an add-subtract counter by means of an operative interconnection between the drill hoist and such counter (0.19' drill rise is equal to 0.266 cubic foot of cavity employing an auger of 16" in diameter); (b) integrating the flow of cementitious mixture, e.g., for every 17.2 revolutions of the cementitious mixture pump, subtracting one unit from such counter via an operative interconnection between the pump and the counter (assuming that 600 pump revolutions will pump 11.6 cubic feet of cementitious mixture, therefore 17.2 revolutions equals 0.333 cubic foot); and (c) controlling the rate of drill rise to maintain the reading on the counter constant, for example at 0, and to add and subtract such units substantially simultaneously during the drill withdrawal, it being assumed as aforementioned that the pump for the cementitious mixture rotates at a constant r.p.m.

The above method will produce the aforementioned 25% overgrouting because for every one foot of drill rise (which should produce theoretically 1.4 cubic feet of cavity with a 16" diameter drill) there is injected into the cavity 1.76 cubic feet of grout or cementitious mixture. Of course, any desired degree of overgrouting can be employed.

The use of a positive displacement pump 107, such as that employed in the aforementioned U.S. Patent No. 2,796,029, employed in conjunction with a suitable drill rise movement control device has made the present novel depth-volume-integrating feasible. The volume of the grout or cementitious mixture that has left the lower tip of the drill in a given period of time can be expressed as a linear function of the number of revolutions which the pump has made during that same period. The mechanical hoisting device to raise and lower the drill makes it possible to express the movement of the drill in terms of revolutions on one of the several shafts comprising the drive for the drill hoist, for example, the jack shaft 49. Consequently by means of the above described add-substract counter 134 it is possible to correlate the movement of the drill 21 with the volume of the grout pumped.

A preferred apparatus for carrying out the novel method embraces an operative interconnection between the pump 107 and an input 191 of the add-substract counter 134; and also an operative interconnection between the hoist jack shaft 49 and an input 192 of such add-subtract counter 134.

In the form shown the operative interconnection between the pump 107 and said input 191 comprises a rotatable cam 193 which is capable of actuating once in each revolution a microswitch 194. The rotatable cam 193 is driven from a shaft 195 of the pump 107, such drive being effected through an adjustable speed reduction unit 196 having an input sprocket 197 which is in communication with the shaft 195 via, for example, a sprocket chain 198. Thus, for each selected number of revolutions of the pump 107 there may be caused one revolution of the cam 193. Under the circumstances above set forth, for example, 17.2 revolutions of the pump will cause one actuation of the micro-switch 194 and will produce a subtraction of one unit from the counter 134. Such 17.2 revolutions of the pump represents an injection of 0.333 cubic foot of cementitious mixture into the cavity while the drill is being withdrawn.

The other operative interconnection to the add-subtract counter 134 embraces another rotatable cam 199 which is driven by the jack shaft 49, and for each revolution actuates a micro-switch 200 thereby to add one unit to the add-subtract counter via the input 192.

The respective operative interconnection between the microswitches 194 and 200 and their inputs 191 and 192 are respectively designated 201 and 202.

If desired a suitable gearing or adjustable speed reduction device may be interposed between jack shaft 49 and the cam 199 to insure that for example for each 0.19 foot of drill rise the micro-switch 200 will be actuated thereby to add one unit to the counter 134.

It can be demonstrated that for a 16" diameter hole, maintaining the counter 134 at a constant value, for example zero within narrow limits, indicates to the operator of the apparatus that there is being pumped into the cavity the aforementioned 1.76 cubic feet of grout or cementitious mixture for every one foot of rise of the stem. Because the theoretical volume of a 16" diameter hole one foot deep is 1.4 cubic feet, such injection of cementitious mixture represents the aforedescribed over grouting of 25%.

The maintenance of the counter at the constant value, such as zero, can be accomplished by control of the drill rise speed and/or the speed of the pump 107, that is by manipulating the hoist motor lever 130 or its vernier control 130a (FIG. 6), and also by manipulating the throttle lever for the grout pump engine at 113.

Preferably as aforementioned the grout pump is driven at a constant speed, for example at 600 r.p.m. and the counter is maintained at zero or a constant value by manipulation of the rate of drill withdrawal via such lever 130 or vernier control 130a.

As aforementioned the purpose of such over grouting is to accommodate any over drilling of the cavity resulting from eccentric movement of the auger. The degree of over grouting is normally selected on an arbitrary basis, based upon tests.

In operation of the novel apparatus employing the add-subtract counter 134 the operator normally desires to adjust the various control elements to maintain a constant value such as zero on the counter. However if the counter 134 during the withdrawal of the drill should exhibit the numerals 996 in a three window counter this is equivalent to minus 4 units and would indicate that 4 increments of cavity volume had been created during drill withdrawal which had not been matched by 4 increments of the cementitious mixture. Accordingly the operator on observing this would either stop or slow down the rate of withdrawal of the drill in order to permit the volume of grout pumped into the cavity to catch up with the volume of the cavity available. On the other hand if the operator should observe that the counter 134 displays the numeral 4 this would indicate that four increments of cementitious mixture have been injected into the cavity at the instant of observation, which are in excess of the number of increments of available cavity volume and hence it would indicate that there may be an excess of pressure of grout in the cavity or a porous lens in the earth and accordingly the operator normally would increase the upward movement of the drill, for example by speeding up its rate of withdrawal in order to bring the counter back to the value zero and thereby bring into balance the increments of grout with the increments of cavity volume.

It is possible for the two control devices, namely that employing the add-subtract counter 134, and that employing the pressure comparator 171 described above, to supply to the operator conflicting instructions. One acts as a check on the other. For example, where an unexpected porous lens is encountered in the earth during the grouting operation the volume-depth integrating device (134 et al.) would inform the operator that he should continue raising the stem by virtue of the fact that the counter would continue to show adequate matching of increments of cavity volume with increments of grout volume. However, the probable loss of grout pressure due to the porous lens would cause the pressure sensing element 170 to influence the pressure comparator 171 (FIG. 4) to signal the operator to cease the drill withdrawing operation or at least to slow it down by virtue of the drop in pressure of the grout or cementitious mixture. In such a case of conflicting instructions the operator would arrest or stop the withdrawal of the drill and continue to pump the cementitious mixture until either the required pressure had been restored or a predetermined quantity of grout (which would be reflected by a positive count on the counter 134) had been injected at which time the normal grouting operation would be resumed.

If desired, each volumetric increment of cementitious mixture pumped into the cavity may equal (instead of being greater than) each increment of the cavity volume which is vacated by the upward movement of the drill. That is during drill withdrawal it is possible to integrate the extent of drill movement, e.g., for every .24' drill rise to add one unit to the counter; and also in integrating the flow of the cementitious mixture, e.g., for every 17.2 revolutions of the cementitious pump 107, there may be subtracted from such counter one unit (assuming that 600 revolutions of the pump will pump 11.6 cubic feet and hence 17.2 pump revolutions will pump 0.333 cubic foot of cementitious mixture.

Thus, in summary the factors sensed are:

(1) The degree of drop, (Pn-Pg) of FIG. 7a, of grout pressure (Pg), as measured at or near the auger tip or lower end of the auger, below a selected norm grout pressure (Pn) for the particular tip depth. Such degree is indicated by the frequency (F) of the audible signal. The audible signal per se, without regard to its frequency, indicates that a grout pressure exists near the auger tip which is below the desired value. The aforementioned frequency (F) thus is a function of (Pn-Pg).

(2) The theoretical cavity volume (Vc) during auger withdrawal. This is determined by measuring the extent of auger linear movement of rise (R) from the bottom of its hole during such withdrawal and integrating same with hole cross-sectional area (a constant). Thus (Vc) is equal to $R \times \pi r^2$ at any instant where $r$ is equal to the radius of the auger drill. Also Vc is equal to the integral between the limits of zero and hole depth of $R \times \pi r^2$.

(3) Theoretical volume of grout (Vc) pumped into the cavity during auger withdrawal. This is determined by counting the number of grout pump revolutions or turns (T) during such drill withdrawal and integrating same with the volume of grout pumped in one turn (Vg). Thus Vg is equal to $T \times Vg$.

The factors which are adjusted by means of the present novel methods and apparatus are:

(a) the auger rise speed or rate (As) in, for example, feet per minute; and (b) the volumetric inflow rate of the grout (Vg) in, for example, gallons per minute.

It is, of course, possible to employ the mass inflow rate of the grout if desired as the factor to be measured in lieu of volumetric inflow rate, provided the mass inflow rate is properly related to volume.

Referring again to FIG. 7a and to the above description regarding the comparison of the norm grout pressure change with the sensed grout pressure change near the drill tip, it will be noted that in the present invention the apparatus is designed for providing a signal only when the grout pressure (Pg) falls below the desired norm and not when it exceeds such norm. However, if desired, a signaling system may be employed for indicating that the latter condition exists also, namely, that the grout pressure is greater than that desired or the desired norm pressure.

By means of the present invention it is possible to control with precision the pressure of the grout within the cavity so that during auger withdrawal there is substantially no departure of the value Pg from the norm gradient as represented by Pn.

There are thus provided novel methods and apparatus for attaining great stability of grout pressure with reference to a norm during auger withdrawal. Also, there is achieved extraordinarily low drilling time. Further, by means of the present invention there can be attained high volumetric grout inflow rates which result in better and more competitive pile formations, one of the reasons for this being that the high volumetric grout inflow rate allows a more rapid auger withdrawal and hence a reduction in time for the formation of the pile. By virtue of the precision with which the grout pressure Pg can be controlled by means of the present novel methods and apparatus, there can be employed the aforementioned extraordinarily high volumetric grout inflow rate.

By means of the novel methods and apparatus of the present invention it is possible to record against depth, as by means of a movable stylus on a moving strip, for example, of paper, the following factors:

(a) auger torque during drilling;
(b) grout pressure during drill withdrawal; and
(c) the total flow of the grout during drill withdrawal. It is possible to obtain a vertical profile of the finished pile by considering items (b) and (c) above.

Referring to FIG. 2, by way of example, there will now be described such a movable stylus for recording on a moving strip the auger torque during drilling. In FIG. 2 there is shown the hydraulic pump 44a which is operatively connected to the hydraulic motor 68 which turns the auger 21. Interposed in this operative interconnection is the motor control lever 129 for the valve 63 which controls such motor 68, these parts being schematically indicated in FIG. 2.

Also interposed in this operative interconnection is a device 203 which mounts a movable stylus 204, the device 203 reflecting the hydraulic pressures directed to the motor 68 and moving, in a well known manner, the stylus 204 to mark a trace upon a moving strip 205, for example, of paper. The strip 205, for example, is unwound from a roll 206 and wound up in a roll 207, the latter being turned in response to the depth of the pile or in response to time if desired. Thus the lowermost roll 207 in FIG. 2 is preferably operatively connected to the jackshaft 49 or to the cable drum assembly in order that its movement shall reflect accurately the depth of the drill. Accordingly a servo motor 208 may be employed for driving the lowermost roll 207, such servo motor being suitably operatively connected to the aforementioned jackshaft 49 or the cable drum assembly 42 for purposes of clarity, by means which are not shown. The tracing of the torque by the stylus 204 may be employed as a recording of a norm of a test pile which, if the static load tests thereof prove to be satisfactory, can be employed as a norm for determining the torque for subsequent piles which are to be driven. That is, such subsequent piles can be driven until the torque exerted by the auger is equal to the torque required to sink the norm or test pile.

In one form of the invention it is possible to enlarge the drill stem to such a degree that it can receive and properly conduct concrete instead of grout and to measure the pressures of such concrete in a manner as described above.

In a preferred form of the present invention as above described, the pressure of the cementitious material Pg has been measured by means of a sensing device positioned at the lower end or near the lower end of the auger. However, it is possible in another and non-analogous form of the invention to sense the presure of such material at another location, for example, at the swivel 86 (FIG. 3), it being possible to obtain a substantially accurate indication of such pressure at the lower end of the auger by applying a suitable line pressure drop attributable to the passage through the stem of the auger. That is, the pressure changes of the pile forming material at the swivel are reflected at the drill tip.

Also, the novel methods and apparatus successfully achieve the objective of assuring the operator at all times that sufficient grout is being pumped to fill the hole of the cavity formed beneath the auger and this by apparatus equipped with counting or measuring devices that will accurately indicate: (a) the volume of the cavity created during drill withdrawal; and (b) the volume (total flow) of the group pumped during the drill withdrawal; both (a) and (b) being indicated in the same units.

The invention also embraces, in one form thereof, a novel method for forming piles in the earth wherein the torque and the downhaul force exerted on the auger are determined for a test pile. If such pile later proves satisfactory as to static load test, thereafter similar downhaul force and torque are exerted on the auger for subsequent piles. In more detail, such method consists in drilling a hole in the earth by sinking to a selected depth an auger type drill having a hollow stem by rotating same in a drill sinking direction while measuring the torque required to turn the drill and also measuring the downhaul force exerted thereupon. A cementitious mixture is forced into such hole through said stem while withdrawing the drill from the earth together with the earth in its auger flights thereby to fill the cavity formed beneath the drill as it is withdrawn. After withdrawal of the drill the cementitious mixture is allowed to harden to form a finished pile. Thereafter the pile is subjected to a load test thereby to relate the aforementioned measured torque and downhaul force to the load test. Thereafter, providing the load test is satisfactory, the drill is sunk in other pile locations to a depth at which the torque acting on the drill reaches a value substantially similar to the final torque required to sink the test pile, a substantially constant downhaul force being supplied to the drill which may be substantially similar to the downhaul force exerted during the sinking of the drill to form the first hole. Thereafter the drill is lifted out of the earth while concurrently forcing cementitious mixture into the cavity also via the hollow stem. With respect to the formation of the first pile aforementioned, namely, the test pile, in some cases we have found it advantageous to measure the torque and the downhaul force required for only the last few feet of penetration of the drill, say 2 feet, the power source, that is, the engine 55, being then driven at a constant r.p.m. and thus driving the hydraulic pump 44 at a constant r.p.m. We have found it desirable for the grout to have an ultimate compressive strength, for example, of not less than 4,000 p.s.i. after passage of 28 days. The grout, for example, may be composed of Portland cement and clean sharp sand or a mixture of such cement, sand and gravel or crushed stone. The grout, of course, is placed by pumping it through the stem to the cavity and at no time is the auger tip raised above the level of the grout therein. We have also found it desirable that the grout be placed under positive head of, for example, 5 p.s.i. in excess of overburden soil weight.

The above-described method regarding the placing of a test and subsequent piles applies to piles which are substantially the same length, for example, 50 feet, it being recognized that it is possible for a final torque and a downhaul force to be exerted on a subsequent pile at a penetration of 25 feet which is similar to the final torque and downhaul force exerted upon a test pile 50 feet in penetration, the load-bearing capabilities of these two piles obviously being unequal. The auger torque and downhaul force exerted on the auger, for example, during the last 2 to five feet of say a 50-foot test pile hole, is considered significant and is employed at substantially the same penetration for subsequent piles. Also, the aforementioned method regarding the placing of test and subsequent piles is intended to be employed in a drilling area where the soil conditions are substantially the same.

In connnction with the position and location of the sensing means for sensing the grout pressure, there has been described above (FIGS. 2, 7, 13 and 14) that the differential pressure diaphragm element is positioned with its diaphragm facing outwardly of the drill stem. However, if desired, it is possible to position such sensing element so that its diaphragm is facing inwardly of the stem and senses the pressure of the grout directly within the flared lower tubular portion 138 (FIG. 13). Such positioning of the pressure sensing element comprises a further and non-analogous embodiment of the invention.

We have found that in certain instances and under certain conditions of the earth drilled by the above-described auger, the grout or other cementitious material under pressure within the cavity beneath the drill is able to force its way up to the surface of the earth via the helical path defined by the spiral flights. The grout thus forces its way past the earth in the spiral flights of the auger or it may force some of the earth ahead of it while it pushes up the spiral path and out onto the earth. This is highly undesirable and fouls the drill site with grout. Accordingly, in one form of the invention, we have found that it is advantageous to create a dynamic pressure to resist such intrusion of the grout into the spiral flights, this being accomplished by turning the auger in an unscrewing direction while withdrawing it from the earth. When the auger is turned in a downscrewing direction to sink the drill, the earth is forced upwardly and out alongside the edge of the hole as shown in FIG. 7. However, when the auger is turned in an opposite direction, namely, the aforementioned upscrewing direction during withdrawal, an opposite force is exerted on the earth in the flights tending to urge it into the cavity and it is the dynamic pressure of such earth under these conditions which acts to resist intrusion of the grout into the flights of the auger. The pressure of the grout or other cementitious mixture is controlled, in accordance with the present invention, during such withdrawal and counter-rotation of the auger thereby to prevent a dumping of earth from the flights of the auger into the cavity. Thus such counter-rotation of the drill creates a dynamic pressure by means of the earth in the flights which resists the tendency of the grout to flow up the flights and out onto the surface of the earth.

We have also found it desirable to fill with cementitious material the pertinent conduit or passage in the hollow stem of the drill prior to commencing the drilling. The purpose of this is to preempt the space in such conduit or passage thereby to prevent the intrusion of water during the drilling operation. This takes place at the outset of the drilling operation when the drill is vertical, its tip is on the surface of the earth and adequate pressure is placed upon the grout valve to close it, at which time the grout pump is started and the grout is caused to fill the inner stem 70.

Reverting to the pressure sensing and control system 169 of FIGS. 2, 4 and 7, we have found it advantageous, in one form of the invention, to employ systems analogous to those disclosed in the following U.S. Patents 1,980,148, 2,126,693, 2,162,474, 2,288,880, 2,303,316 and 2,307,911.

Referring to method and apparatus for placing reinforcing bars in the pile (FIGS. 19–24) it is possible to place only the reinforcing bars spaced radially outwardly from the pile center while refraining from placing the central reinforcing bar. In connection with FIG. 19, thus it is possible to employ a drill bit which is to be retrieved and not expended, in which event the drill bit will be suitably conformed to permit the drop-out of the reinforcing bars 153c. It will be noted that the valve plate 145 is provided with cutaway portions 145a for this purpose and in the event that it is desired to retrieve the drill bit 148a it also will be provided with suitable cutaway portions for the same purpose.

In connection with FIG. 22, it is also, of course, possible to install only the reinforcing bars spaced radially outwardly; from the center of the pile and to refrain from installing a central bar.

Also it is possible to employ the present methods and apparatus with or without the use of the drilling medium.

In a further and non-analogous form of the invention it is possible to sense the pressure of the grout, for example, at the upper end of the drill in the region of the grout swivel 86, but preferably such pressure is to be sensed at this location only when the depth of penetration of the drill is substantial. As the drill is lifted out of the earth, the grout pressure as measured near such swivel becomes less significant. If desired, the grout pressure can be sensed during the initial portion of the withdrawal of the drill near such swivel and during all or any part of the remaining portion of the withdrawal at the region of the drill tip.

For example, in one form of the invention it is possible to sense the pressure of the grout swivel 86 say for the first third of the withdrawal of the drill from the hole and measure the grout pressure on the drill tip say for the latter two thirds of the withdrawal.

What is claimed is:

1. Apparatus for forming piles in the earth including: an auger type drill adapted to drill a hole in the earth by sinking same to a desired depth by turning, said drill having a hollow tubular stem and spiral flights; drill hoist means for withdrawing the drill from such a hole in the earth thereby forming beneath the drill a cavity adapted to receive a pile-forming substance, the cavity being of a volume which progressively increases as the drill is withdrawn; means for filling the cavity completely during such drill withdrawal including a pump for forcing therein via the hollow stem of the drill such pile-forming substance; pressure sensing means being disposed adjacent the lower end of the drill; means for controlling said hoist means to regulate the speed of drill withdrawal; means for controlling said pump speed to regulate the volumetric rate of inflow of such substance into the cavity; depth measuring means for relating pressure at a measured depth simultaneously to a preselected pressure at the same depth; means for changing at least one of said speeds to match the value of the actual pressure to the preselected value at the instant drill end depth.

2. Apparatus for forming piles in the earth including an auger drill; an auger drive for sinking such drill into the earth by turning same, such drill being in a substantially vertical attitude; hoist means for withdrawing the drill from a hole drilled in the earth, said drill having a hollow stem and spiral flights; pump means for forcing a cementitious material into a cavity formed beneath the drill during its withdrawal from such hole; pressure sensing means being disposed adjacent the lower end of the drill; means for controlling said hoist means to regulate the speed of drill withdrawal; means for controlling pump speed to regulate the volumetric rate of inflow of such substance into the cavity; depth measuring means for relating pressure at a measured depth simultaneously to a preselected pressure at the same depth; means for changing at least one of said speeds to match the value of the actual pressure to the preselected pressure value at the instant drill end depth.

3. In apparatus of the class described, an auger type earth drill having a hollow stem and spiral flights surrounding said stem, the latter having two separate passages therethrough respectively for conducting a drilling medium and a pile-forming material, such as grout, said passages comprising concentric cylindrical conduits, the conduit for conducting the pile-forming material comprising the inner of the two; and a valve construction mounted in the lower end of said auger and comprising: a tubular member having a central passage therethrough in register with the passage for conducting the pile-forming material, said tubular member having a lowermost peripheral portion comprising a valve seat, a valve plate for serving the dual purpose of mounting a drill bit and coacting with said valve seat, means for mounting said valve plate for axial movement relative to said valve seat and comprising a plurality of bar members rigidly secured to said valve plate and slidably mounted upon said auger, and means rigidly secured to said valve plate for mounting a drill bit, said bar members serving the dual purpose of holding said valve plate in alignment with said valve seat and transmitting torque to the drill bit by coaction with said auger.

4. In apparatus of the class described, an auger type earth drill having a hollow stem; a valve construction for the lower end of said drill comprising an end element for moving with respect to one extremity of said drill, said end element having a passage therein for conducting a pile-forming substance; means for mounting said end element upon said drill for axial movement to a position wherein the orifices of said passage are closed by the lower portion of said hollow stem and also for axial movement to a position below such lower portion of said stem thereby to open such passage and to permit the flow of such substance therefrom; said means for mounting including a pair of spaced collars mounted on said drill, a plurality of vertically extending posts attached to said end element, said collars being perforated for receiving said posts in sliding engagement, means for operatively associating said end element with said drill stem for shifting same axially with respect to the drill stem in response to relative angular movement of said end element and said drill stem; and means upon said end element for mounting a drill bit.

5. In apparatus of the class described, an earth drill of the auger type having a hollow stem and spiral flights surrounding said stem, said drill having means for placing reinforcing bars in the earth concurrent with the withdrawal of the drill from a hole drilled in the earth by it and including an expendable drill bit, a plurality of radially spaced guide tubes of various preselected lengths, a like plurality of reinforcing bars of like lengths respectively, means disposed in the lower portion of each of said tubes for preventing its corresponding bar from being pushed up into its tube, releasable means disposed at the top of each tube for releasably holding the bars respectively, a stud connecting said expendable drill bit with the lower extremity of said drill, such stud being secured to the drill bit and having integral therewith and coaxial thereof a reinforcing bar extending into the hollow stem of said drill, said stud having a polygonal cross-section for coacting in torque transmitting relation with a collar secured to the lower end of said drill, which collar embraces said stud, said drill bit and reinforcing bar secured thereto by virtue of a relatively loose fit of said stud in said collar being releasably in response to sinking of the drill to a selected depth into the earth.

6. In apparatus of the class described, an auger drill having a hollow stem and having at least two passages in said stem separate from one another, one of such passages being centrally disposed within said stem and the other passage being located around said central passage and within said stem, said central passage being adapted for conducting cementitious pile-forming material, such as grout, therethrough; and a grout valve located at the lower extremity of said drill and including: a valve plate, means for operatively associating said valve plate with the lower extremity of said drill for axial movement relative thereto to open and close said grout valve, said valve plate coacting with one extremity of said central passage, said means for operatively associating said valve plate with the end of said drill comprising means for transmitting torque concurrently thereto from said drill, a stud, said valve plate having at least one passage formed therein through which passes said stud, an expendable drill bit secured to said stud passing through said passage in the valve plate, said stud having integral and coaxial therewith a reinforcing bar, said reinforcing bar extending into said central passage, said expendable drill bit and said stud and reinforcing bar attached thereto being releasable from the lower end of the drill when the latter has been sunk to a selected depth and thereby placeable in the bottom of the hole formed by the drill while the latter is withdrawn from such hole formed in the earth.

7. Apparatus according to claim 6 including a plurality of guide tubes secured longitudinally along said stem of the drill, each for receiving a reinforcing bar, each of the the drill each releasable and slidably removable from said drill.

References Cited by the Examiner
UNITED STATES PATENTS

| | | | |
|---|---|---|---|
| 1,181,141 | 5/1916 | Johnson | 61—53.64 X |
| 1,805,265 | 5/1931 | Taussig | 61—53.62 |
| 1,859,814 | 5/1932 | Wyckoff | 173—6 |
| 2,497,377 | 2/1950 | Swann et al. | 61—53.6 |
| 2,360,742 | 10/1944 | Toth et al. | 73—155 |
| 2,729,067 | 1/1956 | Patterson | 61—53.58 |
| 2,920,455 | 1/1960 | Ryser et al. | 61—53.64 |

FOREIGN PATENTS 265,778    3/1950    Switzerland.

EARL J. WITMER, *Primary Examiner.*